United States Patent [19]

Shono

[11] Patent Number: 5,394,250
[45] Date of Patent: Feb. 28, 1995

[54] IMAGE PROCESSING CAPABLE OF HANDLING MULTI-LEVEL IMAGE DATA WITHOUT DETERIORATION OF IMAGE QUALITY IN HIGHLIGHT AREAS

[75] Inventor: Seita Shono, Warabi, Japan

[73] Assignee: Canon Kabushiki Kaisha, Tokyo, Japan

[21] Appl. No.: 955,265

[22] Filed: Oct. 1, 1992

[30] Foreign Application Priority Data

Mar. 10, 1991 [JP] Japan .................. 3-256187
Jun. 1, 1992 [JP] Japan .................. 4-000119
Jun. 1, 1992 [JP] Japan .................. 4-000120
Jun. 1, 1992 [JP] Japan .................. 4-000121

[51] Int. Cl.$^6$ .............................. H04N 1/40
[52] U.S. Cl. ...................... 358/455; 358/447; 358/531; 358/532; 358/534
[58] Field of Search ............. 358/429, 443, 447, 448, 358/452, 455, 456, 463, 465, 466, 531, 532, 534; 340/347 AD

[56] References Cited

U.S. PATENT DOCUMENTS

| | | | |
|---|---|---|---|
| 4,764,748 | 8/1988 | Geen et al. | 340/347 AD |
| 5,121,446 | 6/1992 | Yamada et al. | 382/50 |
| 5,121,447 | 6/1992 | Tanioka et al. | 385/50 |
| 5,130,819 | 7/1992 | Ohta | 358/445 |
| 5,153,925 | 10/1992 | Tanioka et al. | 385/52 |

FOREIGN PATENT DOCUMENTS 2-210959  8/1990  Japan .................. H04N 1/40

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

An image processing apparatus, which stochastically binary-converts lower-bit data of a pixel of interest to improve image quality in a highlight portion, as well as in a low-density portion, is provided. In an image processing apparatus for quantizing multi-value image data to binary data, multi-value image data of a pixel of interest is divided into upper- and lower-bit data by a calculator (24). The lower-bit data is binary-converted by a comparator (25) using a normalized uniform random number generated by a random number generator (26) as a threshold value. The binary-converted data is added to the upper-bit data of the image signal of the pixel of interest by an adder (22), and the sum data is binary-converted by a comparator (18) using one of a plurality of weighted average values of a plurality of pixels near the pixel of interest, which values are calculated by a calculator (600), on the basis of binary data of pixels, which have already been binary-converted before the pixel of interest. At this time, the density is preserved by distributing a density error generated upon binary conversion to non-binary-converted pixels near the pixel of interest by a circuit including a subtracter (17), an adder (22), and the like.

31 Claims, 24 Drawing Sheets

MULTI-VALUE IMAGE

| $f(i-2,j-2)$ | $f(i-1,j-2)$ | $f(i,j-2)$ | $f(i+1,j-2)$ | $f(i+2,j-2)$ |
|---|---|---|---|---|
| $f(i-2,j-1)$ | $f(i-1,j-1)$ | $f(i,j-1)$ | $f(i+1,j-1)$ | $f(i+2,j-1)$ |
| $f(i-2,j)$ | $f(i-1,j)$ | $f(i,j)$ | $f(i+1,j)$ | $f(i+2,j)$ |

F I G. 4 (a)

BINARY-CONVERTED IMAGE

| $B(i-2,j-2)$ | $B(i-1,j-2)$ | $B(i,j-2)$ | $B(i+1,j-2)$ | $B(i+2,j-2)$ |
|---|---|---|---|---|
| $B(i-2,j-1)$ | $B(i-1,j-1)$ | $B(i,j-1)$ | $B(i+1,j-1)$ | $B(i+2,j-1)$ |
| $B(i-2,j)$ | $B(i-1,j)$ | $B(i,j)$ | | |

F I G. 4 (b)

WEIGHTING MASK

| $R_1(-2,-2)$ | $R_1(-1,-2)$ | $R_1(0,-2)$ | $R_1(1,-2)$ | $R_1(2,-2)$ |
|---|---|---|---|---|
| $R_1(-2,-1)$ | $R_1(-1,-1)$ | $R_1(0,-1)$ | $R_1(1,-1)$ | $R_1(2,-1)$ |
| $R_1(-2,0)$ | $R_1(-1,0)$ | $R_1(0,0)$ | $R_1(1,0)$ | $R_1(2,0)$ |

$R_1(0,0) = R_1(1,0) = R_1(2,0) = 0$

F I G. 4 (c)

WEIGHTING MASK

| $R_2(-1,-1)$ | $R_2(0,-1)$ | $R_2(1,-1)$ |
|---|---|---|
| $R_2(-1,0)$ | $R_2(0,0)$ | $R_2(1,0)$ |

$R_2(0,0) = R_2(1,0) = 0$

F I G. 4 (d)

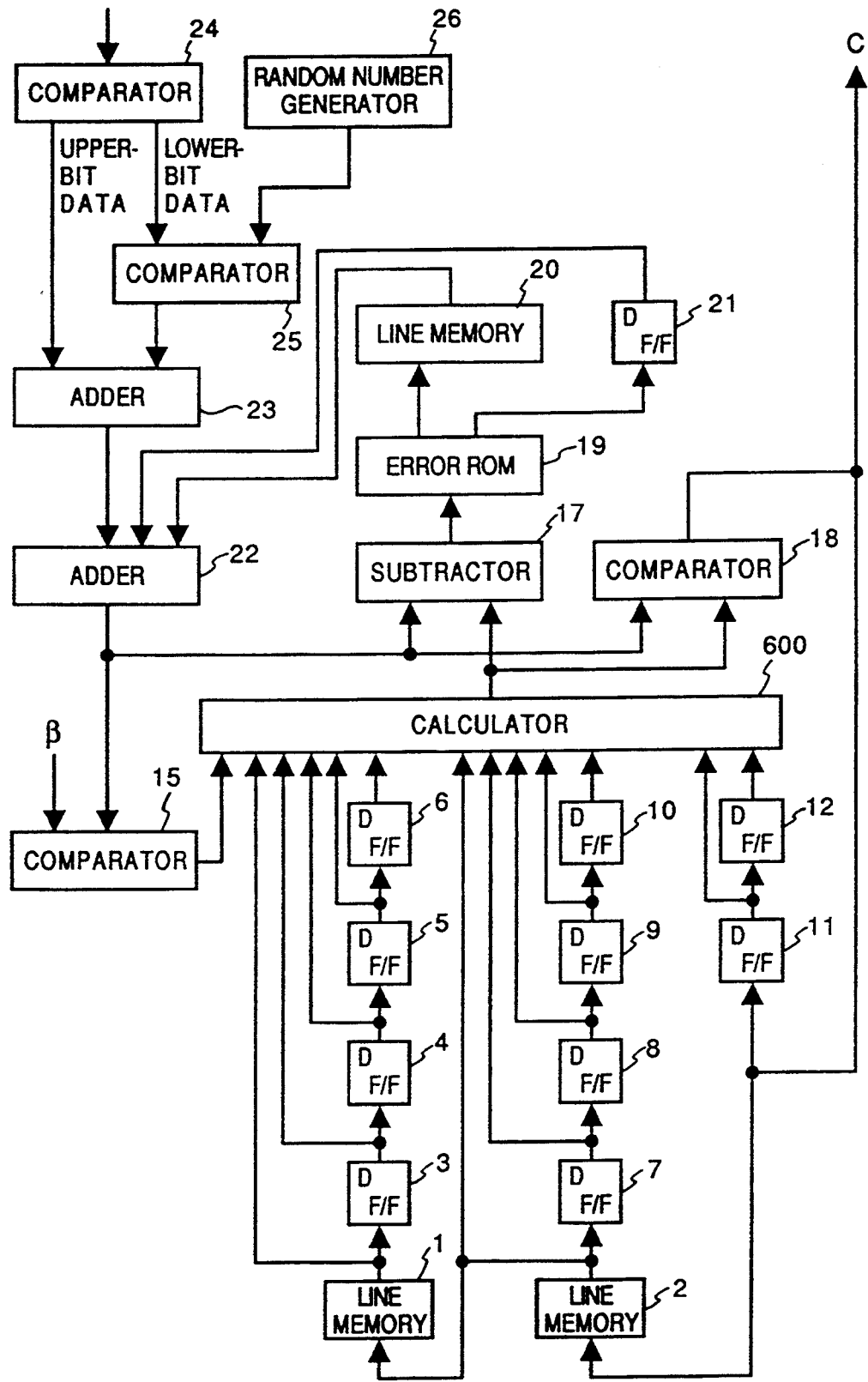
F I G. 6

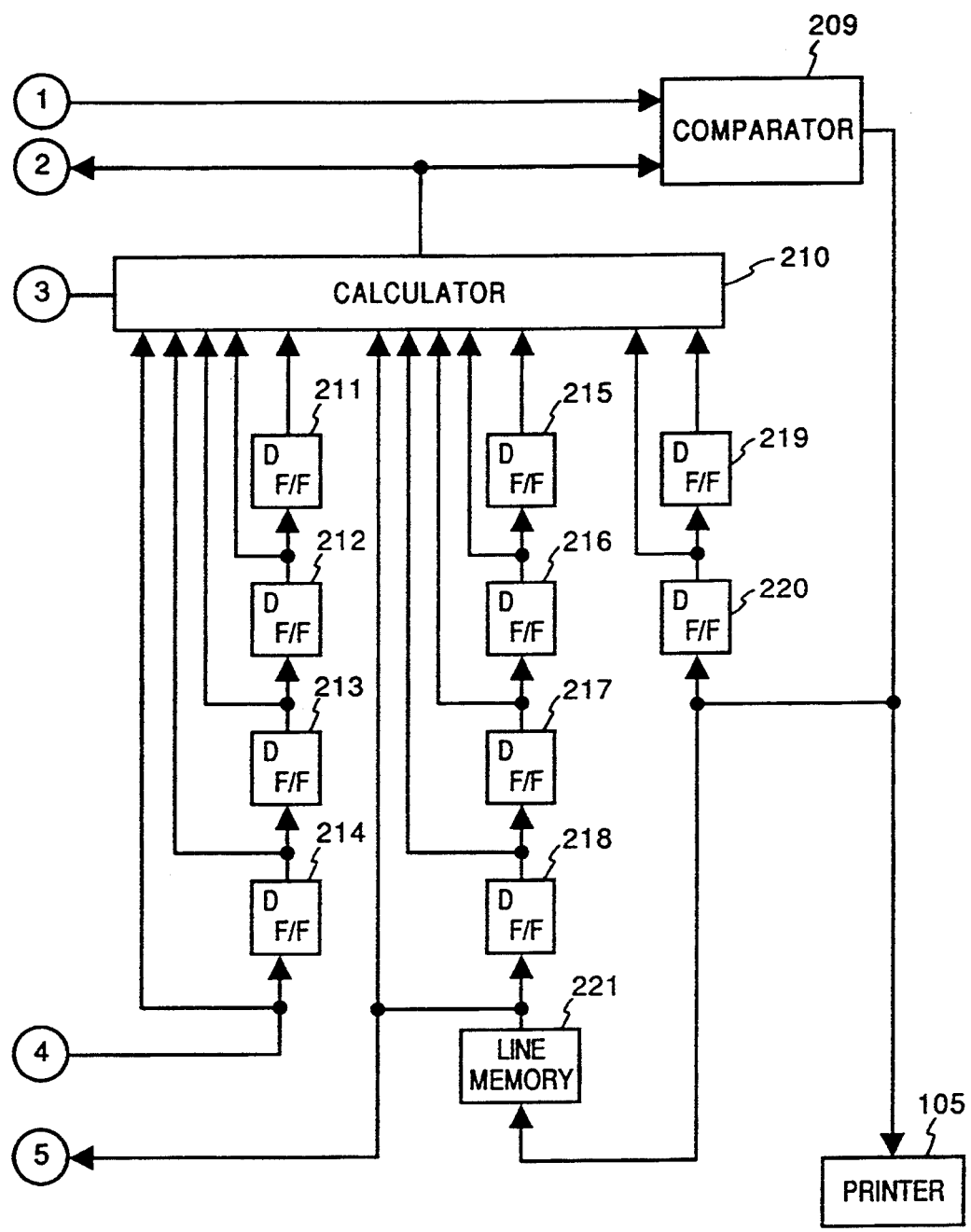
F I G. 8

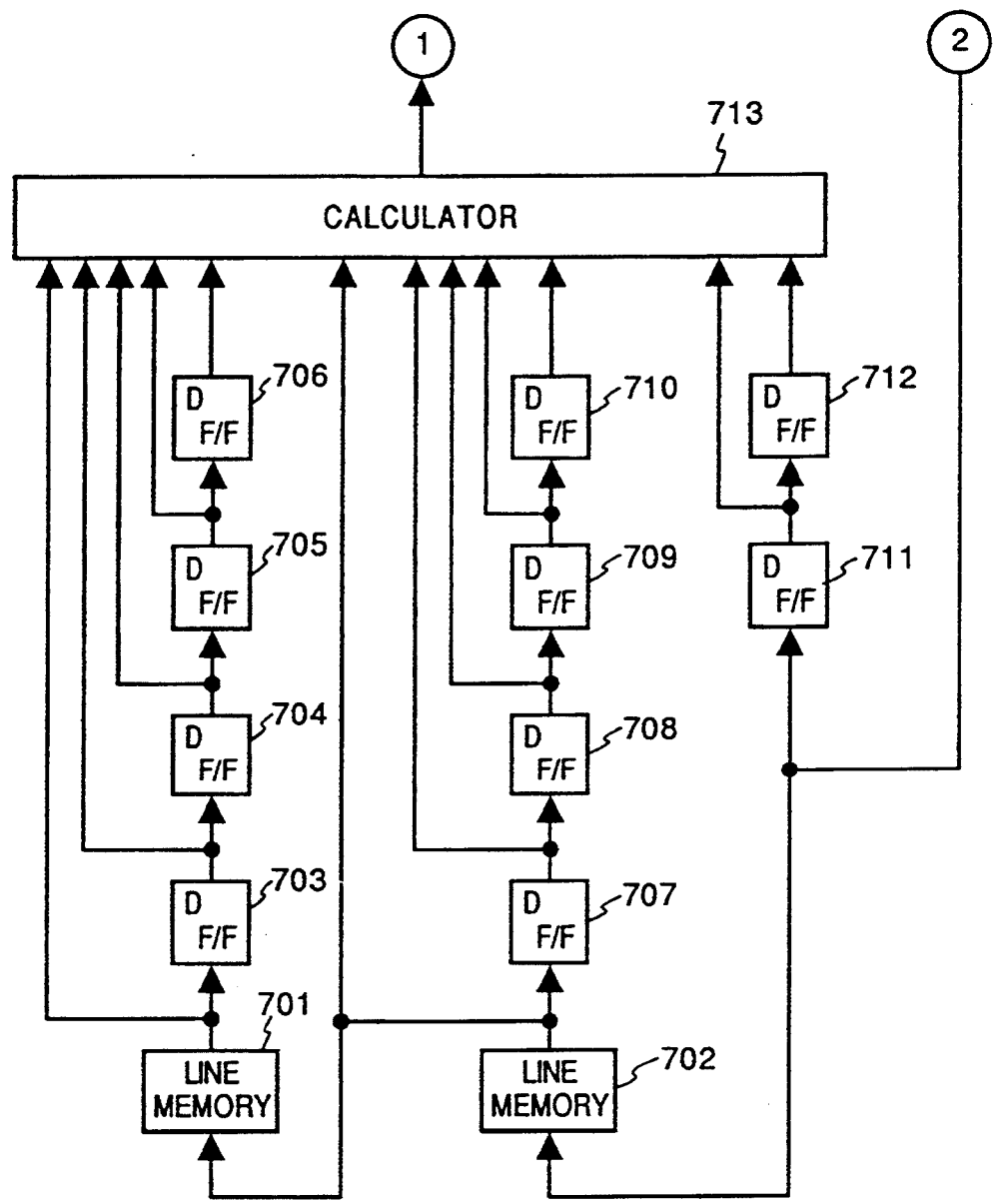
F I G. 11

| 0 | 8 | 2 | 10 |
|---|---|---|---|
| 12 | 4 | 14 | 6 |
| 3 | 11 | 1 | 9 |
| 15 | 7 | 13 | 5 |

F I G. 13

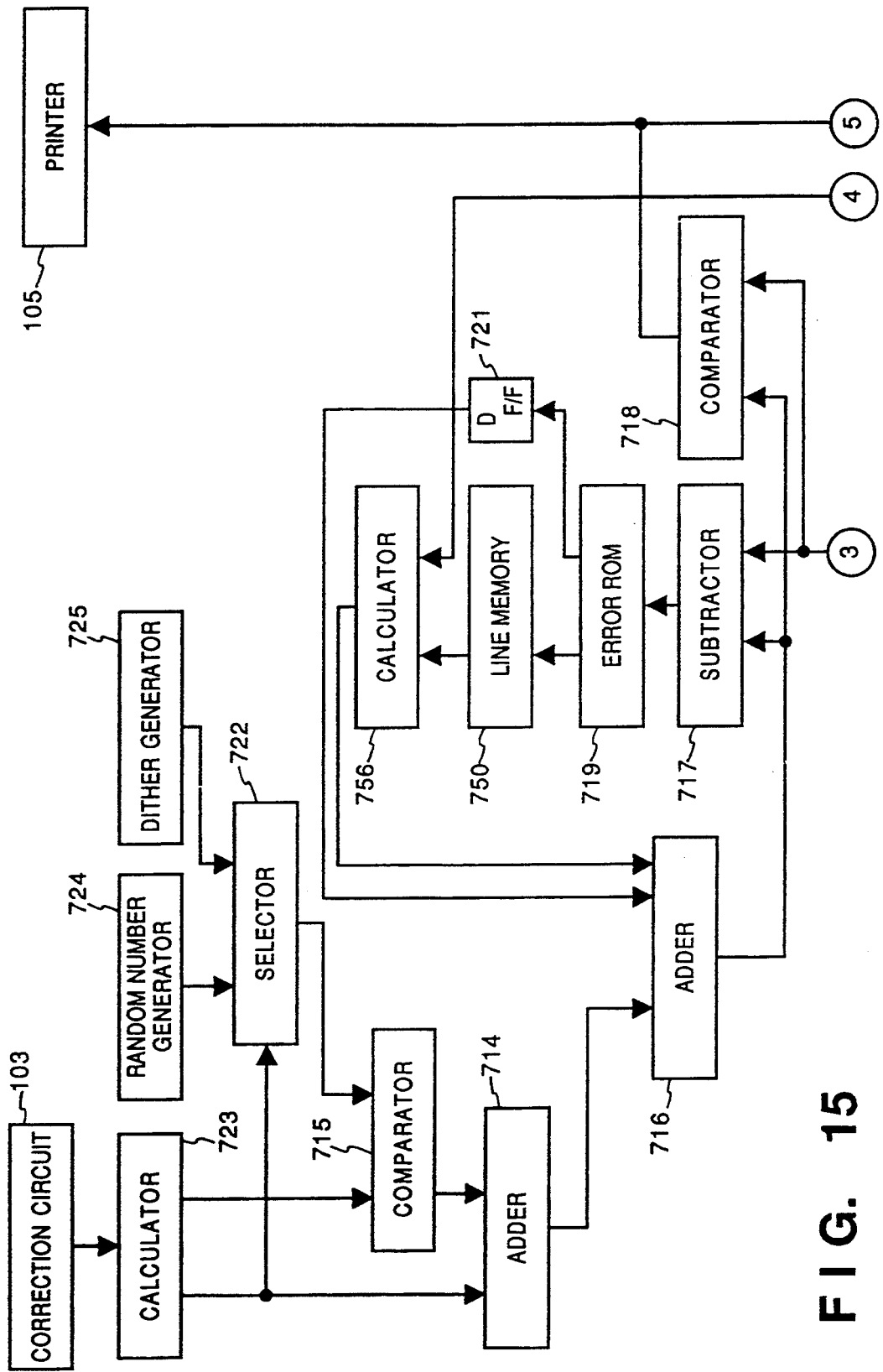
F I G. 15

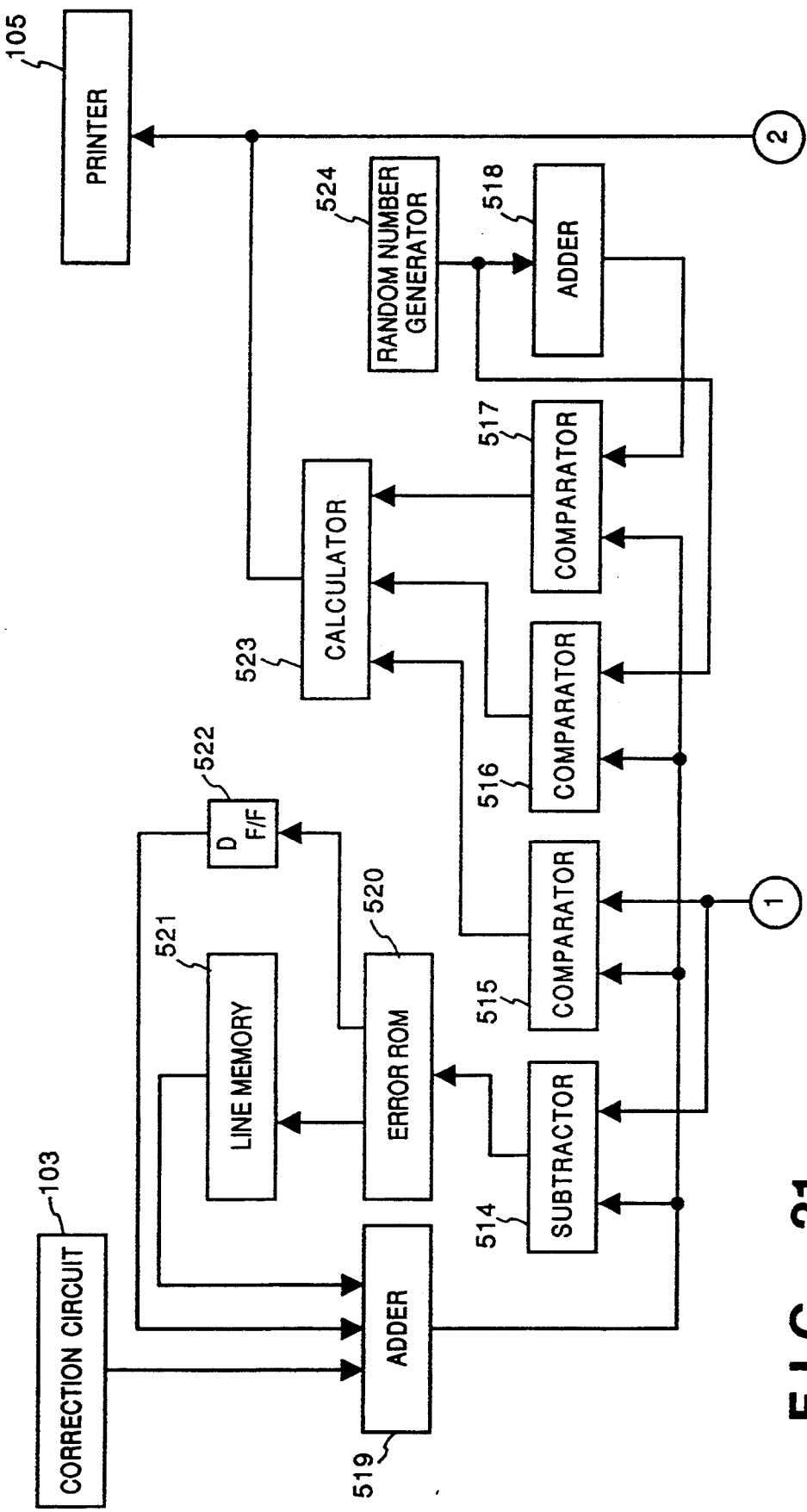
F I G. 21

IMAGE PROCESSING CAPABLE OF HANDLING MULTI-LEVEL IMAGE DATA WITHOUT DETERIORATION OF IMAGE QUALITY IN HIGHLIGHT AREAS

BACKGROUND OF THE INVENTION

The present invention relates to an image processing apparatus for quantizing multi-value image data to n-value image data and, more particularly, to an image processing apparatus for quantizing multi-value image data to binary or ternary data.

As a pseudo-halftone processing system used in, e.g., a digital copying machine, a facsimile apparatus, or the like, an image processing apparatus disclosed in, e.g., "Japanese Patent Laid-Open No. 2-210959" has been is proposed.

In this image processing apparatus, an operation for binary-converting a pixel of interest to black or white using binary data of already binary-converted pixels near the pixel of interest, and adding an error generated upon binary conversion to multi-value data of non-binary-converted pixels near the pixel of interest is sequentially repeated in units of pixels.

More specifically, an average density is calculated using only already binary-converted data, and input multi-value data are binary-converted using the average density as a threshold value. For this reason, in this binary conversion method, binary conversion can be realized with a relatively small processing amount, and an error between input multi-value data and the average density, which error is generated upon binary conversion of the input multi-value data, is corrected. Thus, an image having good gradation characteristics can be obtained.

However, in the above-mentioned binary conversion method, since a pixel of interest is binary-converted according to conditions of neighboring pixels, dots are inevitably connected in a highlight portion, and the image quality in the highlight portion undesirably deteriorates.

Also, image quality in a low-density portion deteriorates.

Since an error generated upon binary conversion is added to surrounding non-binary-converted pixels, a memory for holding error data is required. Conventional method of binary required, resulting in high memory cost.

Furthermore, a conventional method of binary-converting a halftone image include a dot method, a dither method, an error diffusion method, and the like. Recently, even in the field of ink-jet recording, an output apparatus capable of outputting a plurality of kinds of values (n-value), e.g., ternary data using two kinds of, i.e., dark and light inks, or a plurality of kinds of inks, by changing the dot size, has been developed. Thus, the binary conversion method is expanded to cope with n-value data, e.g., ternary data.

However, when quantization is performed using these methods, a pseudo-edge is undesirably generated in a portion, corresponding to a moderate change in gradation, of an image.

SUMMARY OF THE INVENTION

The present invention has been made to solve the above-mentioned problems, and has as its object to provide an image processing apparatus, which can improve image quality of a highlight portion and can also improve image quality of a low-density portion by stochastically binary-converting lower-bit data of a pixel of interest.

It is one object of the present invention to provide an image processing apparatus in which storage areas are shared by a binary data memory means and an error memory means, and the ratio of the areas is changed according to processing, so that high-quality images can be obtained for various kinds of images, and an efficient memory arrangement can be realized.

It is aspect another object of the present invention to provide an image processing apparatus, which stochastically quantizes lower bits of pixel data of a highlight portion, so that binary conversion, which has been performed using only surrounding pixel data, can be properly distributed, and deterioration of image quality due to connection of dots can be prevented, or which quantizes, using a dither threshold value, lower bits of pixel data at a middle density at which granular noise tends to be conspicuous, thereby suppressing generation of granular noise.

It is another object of the present invention to provide an image processing apparatus, which can perform quantization that can suppress generation of pseudo-edges, and can provide a high-quality image.

It is another aspect of the present invention to provide an image processing apparatus, which can prevent dots from being concentrated under a predetermined condition without impairing the resolution uses the density values of surrounding pixels and some normalized random number values or uniformly generated two random number values as threshold values, and the density includes stochastic factors.

It is still another aspect of the present invention to provide an image processing apparatus, which can present good gradation expression by distributing a density error generated upon quantization to non-n-value-converted pixels, and can be realized by low-cost hardware since the processing amount involved is small.

As a means for achieving the above-mentioned objects, the present invention comprises the following arrangement.

There is provided an image processing apparatus for quantizing multi-value image data to binary data, comprising average value calculation mean for calculating a plurality of weighted average values of a plurality of pixels near a pixel of interest on the basis of binary data of pixels which have already been binary-converted before the pixel of interest, random number generation means for generating a normalized uniform random number, lower-bit binary-conversion means for binary-converting lower-bit data of an image signal of the pixel of interest on the basis of the random number value generated by the random number generation means, adder means for adding the lower-bit data binary-converted by the lower-bit binary-conversion means to upper-bit data of the image signal of the pixel of interest, and upper-bit binary-conversion means for binary-converting the upper-bit data of the image signal of the pixel of interest on the basis of a plurality of weighted average values calculated by the average value calculation means.

With the above arrangement, since lower-bit data of a pixel of interest is stochastically binary-converted, image quality of a highlight portion can be improved, and image quality of a low-density portion can also be improved.

There is also provided an image processing apparatus for quantizing multi-value image data to binary data, comprising binary data memory means for storing binary data of pixels, which have already been binary-converted before a pixel of interest, average value calculation means for calculating a weighted average value near the pixel of interest on the basis of the binary data stored in the binary data memory means, random number generation means for generating a normalized uniform random number, lower-bit binary-conversion means for binary-converting lower-bit data of a multi-value image signal on the basis of the random number value generated by the random number generation means, adder means for adding the lower-bit data binary-converted by the lower-bit binary-conversion means to upper-bit data of the multi-value image signal, upper-bit binary-conversion means for binary-converting the sum data from the adder means on the basis of the weighted average value calculated by the average value calculation means, error memory means for storing a density error generated upon binary conversion by the upper-bit binary-conversion means, correction means for preserving a density by distributing the density error stored in the error memory means to non-binary-converted pixels near the pixel of interest, and setting means for sharing storage areas of the binary data memory means and the error memory means, and setting a ratio of the storage areas of the binary data memory means and the error memory means according to processing.

With the above arrangement, since lower-bit data of a pixel of interest is stochastically binary-converted, image quality of a highlight portion can be improved, and image quality of a low-density portion can also be improved.

Since the storage areas are shared by the binary data memory means and the error memory means, and the ratio of the areas is changed according to processing, high-quality images can be obtained for various kinds of images, and an efficient memory arrangement can be realized.

There is also provided an image processing apparatus capable of binary-converting multi-value image data expressed by an n-bit signal by at least two different binary conversion methods in units of pixels, comprising selection means for selecting one of the binary conversion methods on the basis of a value of upper l-bit data (l<n) of the multi-value image data, first binary-conversion means for binary-converting lower m-bit data (m<n) of the multi-value image data by the binary conversion method selected by the selection means, and second binary-conversion means for binary-converting the multi-value image data quantized by binary-converting the lower l-bit data by a binary conversion method different from the binary conversion method for the lower l-bit data.

With the above arrangement, in a highlight portion, since lower bits of pixel data are stochastically quantized, binary conversion, which has been performed using only surrounding pixel data, can be adequately distributed, and deterioration of image quality caused by connection of dots can be prevented. At a middle density at which granular noise tends to be conspicuous, since lower bits of pixel data are quantized using a dither threshold value, generation of granular noise can be suppressed.

There is also provided an image processing apparatus for quantizing multi-value image data to n-value data, comprising calculation means for calculating a weighted average value near a pixel of interest on the basis of n-value data of pixels which have already been n-value-converted before the pixel of interest, random number generation means for generating a normalized uniform random number, second random number generation means for dividing a density area into (n-2) areas, and generating (n-2) normalized second random numbers by normalizing the uniform random number generated by the random number generation means according to the divided areas, n-value conversion means for n-value-converting the pixel of interest on the basis of the weighted average value calculated by the calculation means and the (n-2) random number values generated by the second random number generation means, and correction means for preserving a density by distributing a density error generated upon n-value conversion of the pixel of interest to non-n-value-converted pixels near the pixel of interest.

There is also provided an image processing apparatus for quantizing multi-value image data to ternary data, comprising calculation means for calculating a weighted average value near a pixel of interest on the basis of ternary data of pixels, which have already been ternary-converted before the pixel of interest, random number generation means for generating a normalized uniform random number, ternary conversion means for ternary-converting the pixel of interest on the basis of the weighted average value calculated by the calculation means and the random number value generated by the random number generation means, and correction means for preserving a density by distributing a density error generated upon ternary conversion of the pixel of interest to non-ternary-converted pixels near the pixel of interest.

The above arrangement allows quantization that can suppress generation of a pseudo edge, and can provide a high-quality image.

Since the density values of surrounding pixels and some normalized random number values or two uniformly generated random number values are used as threshold values, and the density includes stochastic factors. Dots can be prevented from being concentrated under a predetermined condition without impairing the resolution.

Good gradation expression can be expected since a density error generation upon quantization is distributed to non-n-value-converted pixels. Furthermore, since the processing amount is small, the apparatus can be realized by low-cost hardware.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4 (a), 4 (b), 4 (c), and 4 (d) respectively show a multi-value image, a binary-converted image, and weighting masks for an average density calculation in units of pixels in this embodiment;

FIG. 6 is a circuit diagram showing the details of a binary conversion circuit according to the third embodiment of the present invention;

FIGS. 7 and 8 are block diagrams showing the details of the arrangement of a binary conversion circuit according to the fourth embodiment of the present invention;

FIGS. 11 and 12 are block diagrams showing the details of the arrangement of a binary conversion circuit according to the sixth embodiment of the present invention;

FIG. 13 is a view showing a dither matrix of the sixth embodiment;

FIGS. 14 and 15 are block diagrams showing the details of the arrangement of a binary conversion circuit according to the seventh embodiment of the present invention;

FIG. 21 is a block diagram showing the details of the arrangement of a quaternary conversion circuit according to the eleventh embodiment of the present invention;

DETAILED DESCRIPTION OF THE PREFERRED EMBODIMENTS

The preferred embodiments of the present invention will be described in detail hereinafter with reference to the accompanying drawings.

[First Embodiment]

Figure 1:
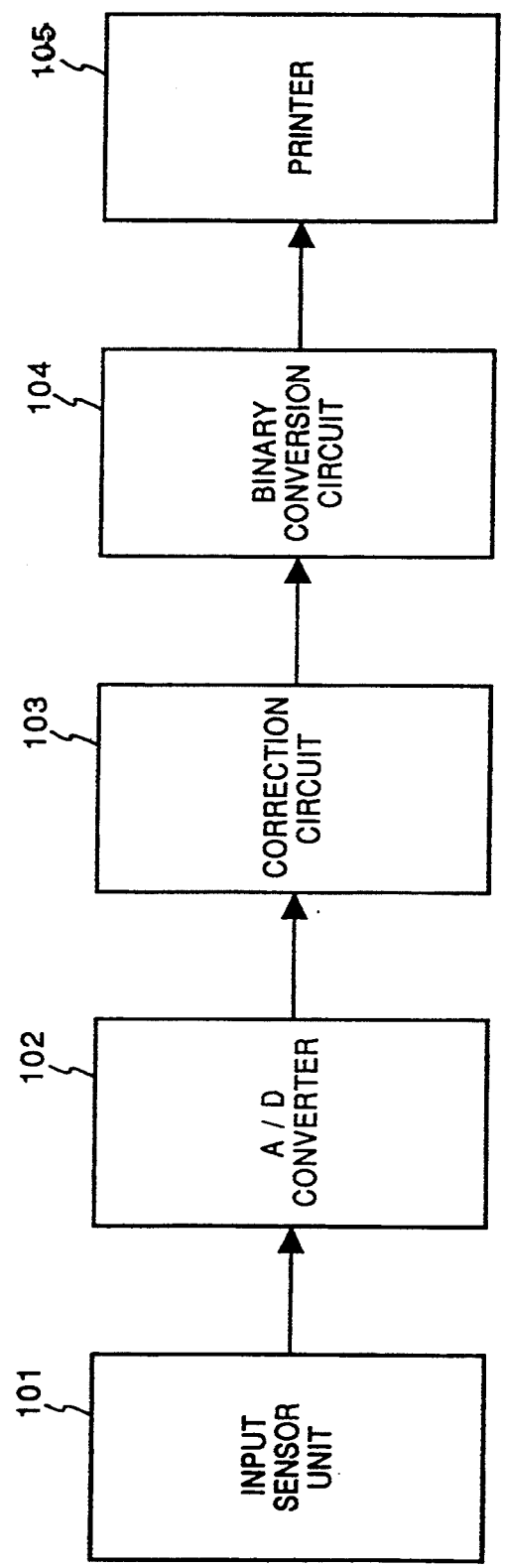
FIG. 1 is a block diagram showing an arrangement of an image processing apparatus according to the first embodiment of the present invention.

FIG. 1 is a block diagram showing an image processing apparatus according to the first embodiment of the present invention.

In FIG. 1, an input sensor unit 101 comprises a photoelectric conversion element such as a CCD, and a driver for driving the CCD, and performs an original reading operation. Original image data read by the input sensor unit 101 is multi-value analog image data. The multi-value analog image data is sequentially supplied to an A/D converter 102, and analog data of respective pixels are converted into corresponding multi-value digital data. Then, a correction circuit 103 performs correction processing, e.g., shading correction for correcting sensitivity nonuniformity of the CCD sensor and illuminance nonuniformity of and illumination light source.

Multi-value image data input to a binary conversion circuit 104 is quantized to binary data by a binary conversion method (to be described later). A printer 105 is of a laser beam type or an ink-jet type, and ON/OFF-controls dots based on binary data sent from the binary conversion circuit 104, thereby reproducing an image on a recording sheet.

Figure 2:
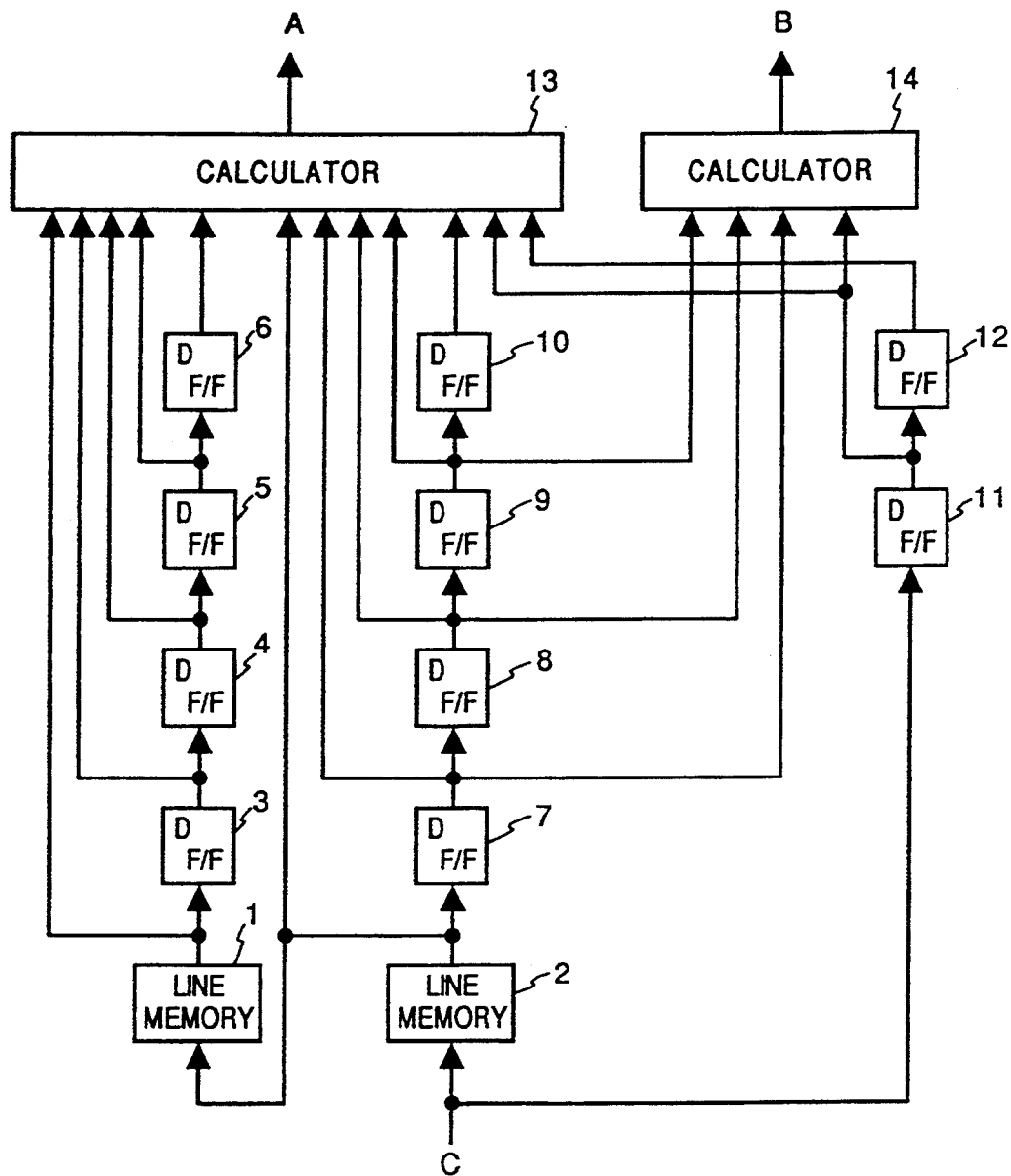
FIGS. 2 and 3 are circuit diagrams showing the details of a binary conversion circuit shown in FIG. 1.
Figure 3:
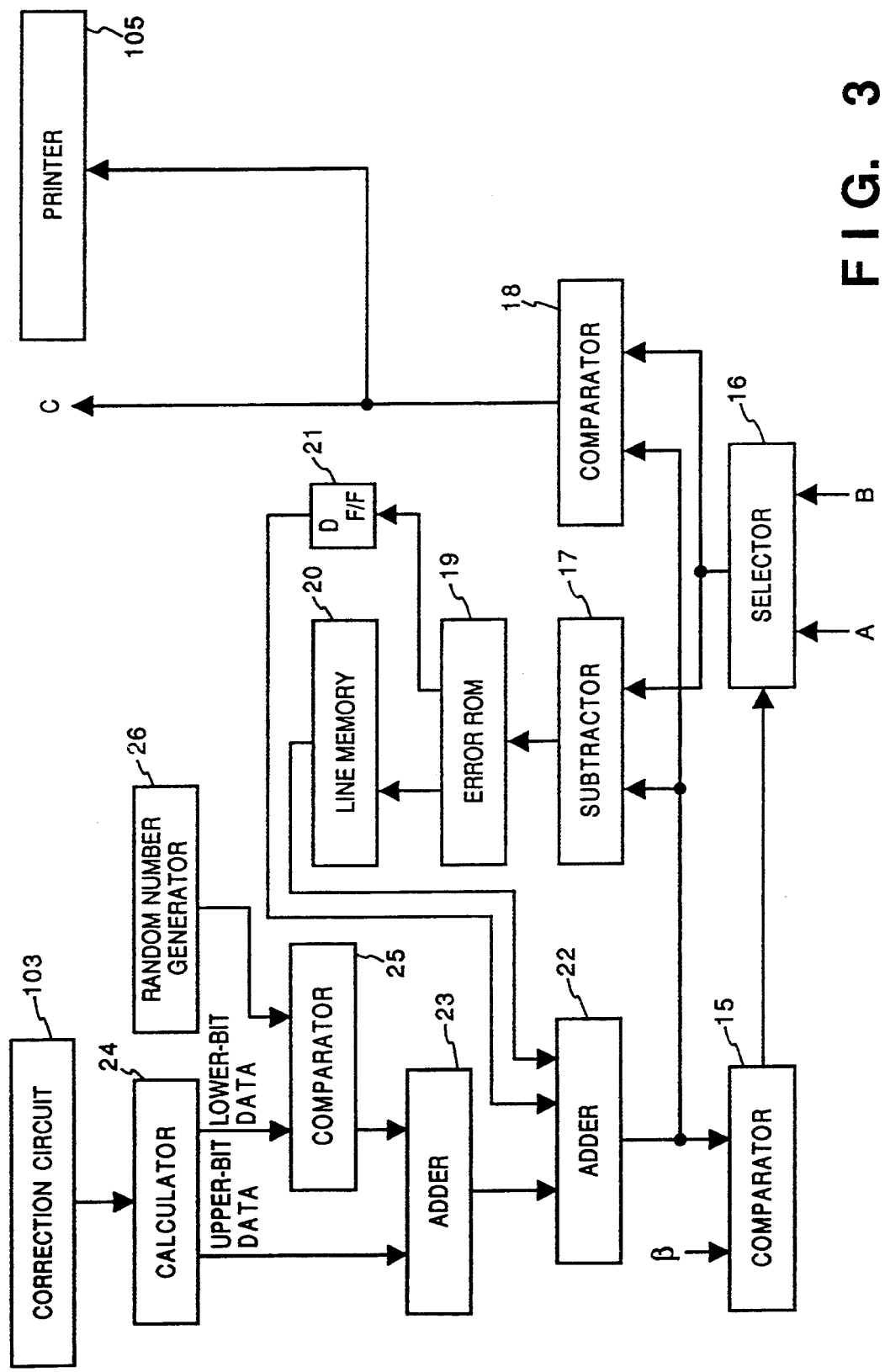

FIGS. 2 and 3 are circuit diagrams showing the details of the arrangement of the binary conversion circuit 104 shown in FIG. 1.

In FIGS. 2 and 3, reference numerals 1 and 2 denote line memories each for storing binary-converted binary image data for one line; 3 to 12, and 21, D-type flip-flops (D F/Fs) each for delaying image data by one pixel; and 13 and 14, calculators for calculating weighted average values of predetermined areas from binary image data near a pixel of interest.

Reference numeral 15 denotes a comparator for comparing quantized data from an adder 22 and a predetermined value $\beta$; 16, a selector for selecting one of a plurality of weighted average values from the calculators 13 and 14 as a threshold value on the basis of a signal from the comparator 15; 17, a subtracter for calculating a difference between the threshold value output from the selector 16 and quantized data of the pixel of interest; 18, a comparator for comparing the threshold value output from the selector 16 and quantized data of the pixel of interest from the adder 22 so as to binary-convert the pixel of interest; 19, an error ROM for calculating error data on the basis of the difference between the quantized data of the pixel of interest and the threshold value output from the subtracter 17; 20, a line memory for storing the error data from the error ROM 19 for one line; 22, an adder for adding error data from the line memory 20 and the D F/F 21 to quantized data from an adder 23 so as to perform density correction of the quantized data; and 23, an adder for adding binary-converted lower-bit data to upper-bit data of a pixel to output quantized data.

Reference numeral 24 denotes a calculator for dividing multi-value pixel data input from the correction circuit 103 into upper- and lower-bit data; 25, a comparator for comparing a threshold value output from a random number generator 26 and the lower-bit data output from the calculator 24 so as to binary-convert the lower-bit data; and 26, a random number generator for generating a uniform random number.

The principle of the binary conversion method in this embodiment with the above-mentioned arrangement will be described below.

FIG. 4 (a) shows multi-value densities of an input image.

In FIG. 4 (a), f(i,j) represents multi-value image data of an input image at the position of a pixel of interest to be binary-converted, and assumes an 8-bit value ranging between 0 and 255. Image data at pixel positions above the broken line in FIG. 4 (a) have already been binary-converted. After binary conversion of a pixel of interest, binary conversion operations of f(i+1,j), f(i+2,j), . . . are sequentially performed.

FIG. 4 (b) shows binary-converted image data.

In FIG. 4 (b), B(i,j) represents binary-converted data (0 or 1) of a pixel of interest. Pixel data surrounded by the broken line have already been binary-converted upon processing of the pixel of interest, and these data are used in binary conversion of the pixel of interest.

FIGS. 4 (c) and 4 (d) show weighting masks.

$R_1$ and $R_2$ represent examples of weighting masks for obtaining average densities. FIG. 4 (c) shows a 5×3 matrix, and FIG. 4 (d) shows a 3×2 matrix.

As weighting masks for non-binary-converted pixels, $R_1(0, 0) = R_1(1,0) = R_1(2,0) = 0$, and $R_2(0, 0) = R_2(1,0) = 0$ are used.

8-bit input image data f(i,j) is divided into upper 6-bit data $f_H(i,j)$ and lower 2-bit data $f_L(i,j)$.

Lower-bit data is binary-converted to 0 or 1 using, as a threshold value, a uniform random number which assumes a value ranging from 0 to 3 at equal probability. The binary-converted lower-bit data $B_L(i,j)$ is added to the upper-bit data $f_H(i,j)$ to obtain quantized data h(i,j).

Then, weighted average densities $m_1(i,j)$ and $m_2(i,j)$ near the pixel of interest are calculated using the already binary-converted pixel data as follows:

$$m_1(i,j) = \Sigma\Sigma R_1(x,y) \cdot B(i+x, j+y)$$

$$m_2(i,j) = \Sigma\Sigma R_2(x,y) \cdot B(i+x, j+y) \quad (1)$$

One of $m_1(i,j)$ and $m_2(i,j)$ is selected according to the quantized data h(i,j) of the pixel of interest and a binary-conversion correction value E(i,j) assigned to the pixel. That is, If $h(i,j) + E(i,j) \leq \beta$, $m(i,j) = m_1(i,j)$ If $h(i,j) + E(i,j) > \beta$, $m(i,j) = m_2(i,j)$ \quad (2)

where $\beta$ is a predetermined value for discriminating a low-density portion, and is set to be about 10% of the maximum density value. In this embodiment, since upper 6 bits are used, the maximum density value is 64. Therefore, a value corresponding to 10% of 64, i.e., $\beta = 6$, is used.

The quantized data h(i,j) of the pixel of interest is binary-converted according to the following equations using the selected m(i,j) and the binary-conversion correction value E(i,j) assigned to the pixel of interest:

If $h(i,j) + E(i,j) > m(i,j)$, $B(i,j) = 1$

If $h(i,j) + E(i,j) \leq m(i,j)$, $B(i,j) = 0$ \quad (3)

A correction value for a binary conversion error generated at that time is similarly calculated.

$$E_1(i+1,j) = E_2(i,j+1) = \{h(i,j) + E(i,j) - m(i,j)\}/2 \quad (4)$$

where $E_1(i+1,j)$ is the correction value assigned to a pixel (i+1,j) next to the pixel of interest, and $E_2(i,j+1)$ is the correction value assigned to a pixel (i,j+1) one line after the pixel of interest.

The binary-conversion correction value E(i,j) assigned to the pixel of interest is calculated by the following equation. That is, this correction value is expressed as a sum of an error $E_1(i,j)$ generated upon binary conversion of a pixel (i−1,j) immediately preceding the pixel of interest and an error $E_2(i,j)$ generated upon binary conversion of a pixel (i,j−1) one line before the pixel of interest by the above-mentioned method.

$$E(i,j) = E_1(i,j) + E_2(i,j) \quad (5)$$

The above-mentioned operation is sequentially repeated in units of pixels, thereby binary-converting the entire image.

In this manner, since lower-bit data is quantized using a random number as a threshold value, the density can be adequately distributed, and connection of dots in a low-density portion can be effectively prevented. Since the density becomes a quantization probability, it can be statistically preserved.

Since upper-bit data is binary-converted on the basis of surrounding pixel data, and its binary conversion error is corrected, the density is preserved, and an image having good gradation characteristics and a high resolution can be obtained. At a low density, since the average density calculation area is widened, connection of dots can be effectively prevented. In combination with the effect obtained by using the random number, a high-quality image of a highlight portion can be obtained. In this case, a line memory is required for a wide average density calculation area for a low-density portion. With the above-mentioned method, however, since a memory for storing a binary conversion error correction value need only store upper-bit data, the memory capacity need not be increased as a whole.

The binary conversion processing of a pixel (i,j) of interest on the basis of the above-mentioned principle of the binary conversion method in the arrangement of this embodiment shown in FIGS. 1 to 3 will be described below.

The line memories 1 and 2 shown in FIG. 2 store binary data of pixels binary-converted before the pixel of interest, and output from the comparator 18 shown in FIG. 3. Upon binary conversion of the pixel of interest, the line memory 2 outputs binary data B(i+2, j−1) one line before the pixel of interest, and the line memory 1 outputs binary data B(i+2, j−2) two lines before the pixel of interest.

The D F/Fs 3 to 12 respectively output data delayed by one pixel.

More specifically, the D F/F 3 outputs data B(i+1, j−2); the D F/F 4, B(i, j−2); the D F/F 5, B(i−1, j−2); the D F/F 6, B(i−2, j−2); the D F/F 7, B(i+1, j−1); the D F/F 8, B(i, j−1); the D F/F 9, B(i−1, j−1); the D F/F 10, B(i−2, j−1); the D F/F 11, B(i−1, j); and the D F/F 12, B(i−2, j).

Binary data from these D F/Fs 3 to 12 are input to the calculator 13.

Of these data, the data B(i+1, j−1), B(i, j−1), B(i−1, j−1), and B(i−1, j) from the D F/Fs 7, 8, 9, and 11 are also input to the calculator 14.

The calculators 13 and 14 respectively calculate a weighted average density value $m_1(i,j)$ indicated by reference symbol A and a weighted average density value $m_2(i,j)$ indicated by reference symbol B from the binary data near the pixel of interest on the basis of the corresponding weighting masks, and output these density values to the selector 16 shown in FIG. 3.

Multi-value data f(i,j) of the pixel of interest sent from the correction circuit 103 is input to the calculator 24 shown in FIG. 3. The calculator 24 divides the input 8-bit multi-value data f(i,j) of the pixel of interest into upper 6-bit data $f_H(i,j)$ and lower 2-bit data $f_L(i,j)$, and outputs these data. The random number generator 26 generates a uniform random number that assumes a value ranging between 0 and 3 in units of pixels.

The comparator 25 binary-converts the lower 2-bit data $f_L(i,j)$ using, as a threshold value, the random number value (0 to 3) generated by the random number generator 26, and outputs binary-converted lower-bit data $B_L(i,j)$. The adder 23 adds the upper 6-bit data $f_H(i,j)$ from the calculator 24 to the binary-converted lower-bit data $B_L(i,j)$ binary-converted to 1 or 0 and output from the comparator 25, and outputs quantized data $h(i,j)$.

The adder 22 adds error correction data $E_1(i,j)$ and $E_2(i,j)$ from the line memory 20 and the D F/F 21 to the quantized data $h(i,j)$, and outputs $h(i,j)+E(i,j)$. The comparator 15 compares the error-corrected quantized data $h(i,j)+E(i,j)$ with the predetermined value $\beta$, and outputs a select signal to the selector 16 on the basis of the comparison result.

The selector 16 selects one of the weighted average density value $m_1(i,j)$ indicated by reference symbol A and the weighted average density value $m_2(i,j)$ indicated by reference symbol B on the basis of the select signal sent from the comparator 15, and outputs the selected density value as a threshold value $m(i,j)$. The subtracter 17 calculates a difference between the error-corrected quantized data $h(i,j)+E(i,j)$ from the adder 22 and the threshold value $m(i,j)$. The comparator 18 binary-converts the error-corrected quantized data $h(i,j)+E(i,j)$ using $m(i,j)$ as a threshold value, and outputs binary data $B(i,j)$ indicated by reference symbol C. The binary data $B(i,j)$ is supplied to the printer 105, and is also input to the line memory 2 and the D F/F 11 shown in FIG. 2 as surrounding pixel data for a pixel to be binary-converted in future.

The data $h(i,j)+E(i,j)-m(i,j)$ output from the subtracter 17 is input to the error ROM 19. The error ROM 19 outputs error data $E_1(i+1,j)$ and $E_2(i,j+1)$ according to equation (4) described above. The data $E_1(i+1,j)$ is delayed by one pixel by the D F/F 21, and is assigned to a pixel $(i+1,j)$. The data $E_2(i,j+1)$ is stored in the line memory 20, and is assigned to a pixel $(i,j+1)$ one line after the pixel of interest.

When the series of processing operations described above are repetitively executed, the binary conversion processing of image data is sequentially performed in units of pixels.

When the above-mentioned binary conversion processing is performed to stochastically binary-convert lower-bit data of a pixel of interest, dots to be printed in a highlight portion can be adequately distributed, and image quality can be improved.

[Second Embodiment]

In the first embodiment described above, only lower 2 bits of a pixel of interest are binary-converted using a random number, and the binary-converted data is added to upper bits. However, the present invention is not limited to the above embodiment, and a random number may be processed according to the level of upper-bit data of a pixel of interest. The second embodiment of the present invention for attaining such control will be described below.

Figure 5:
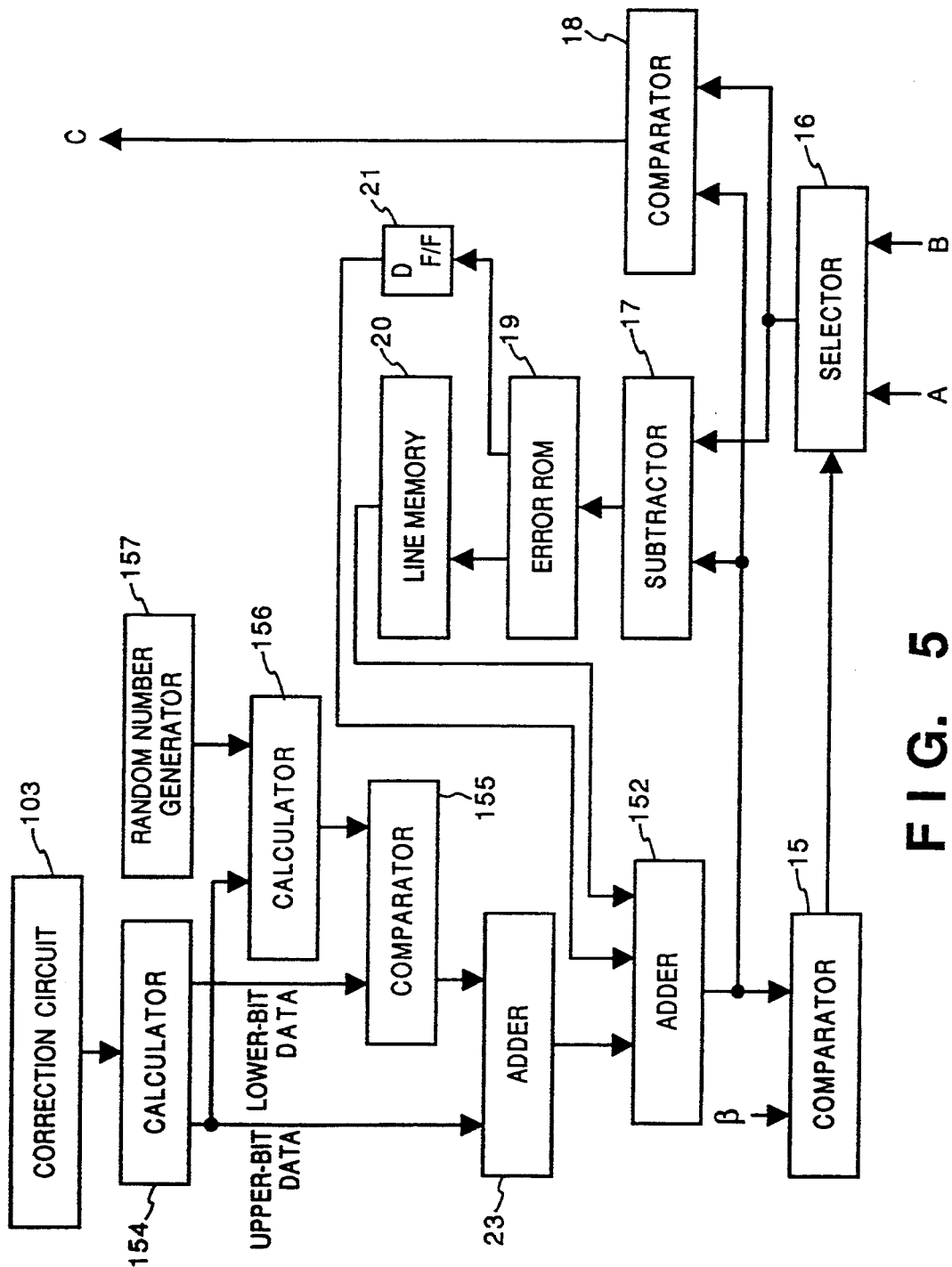
FIG. 5 is a circuit diagram showing a portion, different from the arrangement of the first embodiment, of a binary conversion circuit according to the second embodiment of the present invention.

The arrangement of the second embodiment is substantially the same as that of the first embodiment, except that the arrangement of the first embodiment shown in FIG. 3 is replaced with the arrangement shown in FIG. 5. That is, the second embodiment has the same arrangements as those shown in FIGS. 1 and 2. Even in the different arrangement, the same reference numerals denote the same parts as in the first embodiment, and a detailed description thereof will be omitted.

In FIG. 5, a difference from the first embodiment shown in FIG. 3 is an arrangement including a calculator 154, a comparator 155, a calculator 156, and a random number generator 157.

In the second embodiment, as shown in FIG. 5, the calculator 154 divides 8-bit multi-value data $f(i,j)$ of a pixel of interest sent from the correction circuit 103 into upper- and lower-bit data. In this case, the multi-value data may be divided into upper 4-bit data and lower 4-bit data, or may be divided into upper 2-bit data and lower 6-bit data contrary to the first embodiment.

Thereafter, in the second embodiment, the upper-bit data is input to the calculator 156 together with a random number value generated by the random number generator 157. The output from the calculator 156 serves as a binary-conversion threshold value of the lower-bit data in the comparator 155. The calculator 156 increases an output value (a random number value serving as a binary-conversion threshold value of lower-bit data) in a low-density area, in which upper-bit data from the random number generator 157 becomes 0, according to the value of the upper-bit data, thereby decreasing the dot print probability to suppress connection of dots in a highlight portion.

With the above-mentioned control, since an average density calculation mask is changed in a low-density portion, the influence of surrounding pixel data can be changed, and dots can be prevented from being printed at adjacent positions. As a result, image quality of a low-density portion can also be improved.

[Third Embodiment]

In the first embodiment described above, a plurality of weighted average values are calculated, and one of the plurality of weighted average values is selected as a threshold value on the basis of the quantization level of a pixel of interest. Alternatively, a threshold value may be directly calculated on the basis of the quantization level of a pixel of interest, thus achieving the same effect as in the first embodiment. The third embodiment of the present invention that directly calculates a threshold value on the basis of the quantization level of a pixel of interest will be described below.

FIG. 6 is a block diagram of a binary conversion circuit according to the third embodiment of the present invention, and other portions have the same arrangement as that of the first embodiment shown in FIG. 1. Note that the same reference numerals denote the same parts as in the first embodiment.

In the third embodiment, as shown in FIG. 6, a select signal from a comparator 15 is directly input to a calculator 600 in place of the selector 16 to calculate a weighted average value as a threshold value. Note that the calculator 600 has functions of the calculators 13 and 14 and the selector 16 of the first embodiment, and a function of calculating a weighted average value as a threshold value according to the select signal from the comparator 15. If the calculator 600 is realized by a table arrangement, a calculation can be performed at very high speed.

With the above arrangement, since lower-bit data of a pixel of interest is stochastically binary-converted, dots to be printed in a highlight portion can be adequately distributed, and image quality can be improved.

As described above, according to the above-mentioned embodiments, lower bits are stochastically quantized, and the weighted average density value calculation area for a low-density portion is widened, so that connection of dots in the low-density portion can be prevented, and a high-quality image can be obtained.

In the above description, in the first embodiment, only lower 2 bits of a pixel of interest are binary-converted using a random number, and the binary-converted data and upper bits are added to each other. In the second embodiment, a random number is processed in a low-density area according to the level of upper-bit data of a pixel of interest. However, these functions need not be independently provided. For example, the functions of the first and second embodiments may be combined, so that binary conversion processing of the first embodiment may be performed for a highlight portion, and that of the second embodiment may be performed for a low-density portion. In this manner, when binary conversion processing is optimally performed while switching the functions, a binary-converted image having very high quality can be obtained.

As described above, according to the present invention, when lower-bit data of a pixel of interest is stochastically binary-converted, dots to be printed in a highlight portion can be adequately distributed, and image quality can be improved.

[Fourth Embodiment]

The fourth embodiment of the present invention will be described in detail below.

The fourth embodiment has substantially the same arrangement as the first embodiment, except for only the arrangement of a binary conversion circuit 104. The binary conversion circuit of this embodiment has an arrangement shown in FIGS. 7 and 8.

Figure 7:
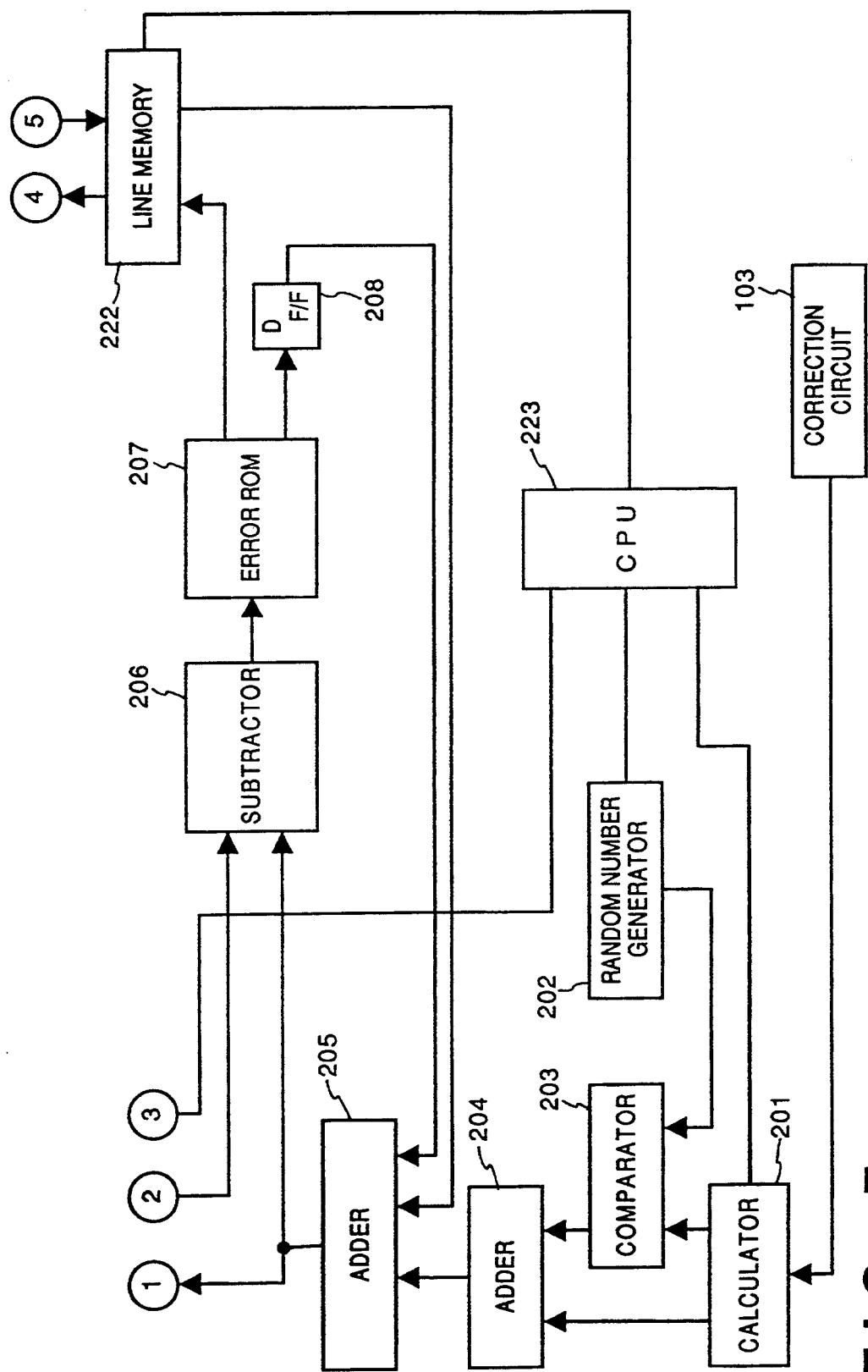

In FIGS. 7 and 8, reference numeral 201 denotes a calculator for dividing multi-value pixel data input from a correction circuit 103 into upper- and lower-bit data; 202, a random number generator for generating a uniform random number serving as a threshold value used upon binary conversion of lower-bit image data in units of pixels; 203, a comparator, using the uniform random number output from the random number generator 202 as a threshold value, for comparing the threshold value and the lower-bit data output from the calculator 201 so as to binary-convert the lower-bit data; 204, an adder for adding the binary-converted lower-bit data to the upper-bit data of the pixel to output quantized data; and 205, an adder for adding error data for density correction to the quantized data.

Reference numeral 206 denotes a subtracter for calculation a difference between the threshold value output from a calculator 210 and the quantized data of the pixel of interest; 207, an error ROM for calculating error data on the basis of the difference between the quantized data of the pixel of interest and the threshold value output from the subtracter 206; 209, a comparator for comparing the threshold value output from the calculator 210 and the quantized data of the pixel of interest so as to binary-convert the quantized data; 210, a calculator for calculating a weighted average value of a predetermined area on the basis of binary image data around the pixel of interest, and outputting the weighted average value as a threshold value; and 208 and 211 to 220, D F/Fs (D-type flip-flops) each for delaying image data by one pixel.

Reference numeral 221 denotes a line memory for storing binary-converted binary image data for one line; 222, a line memory, which can change its storage area, for storing binary data and density error correction data for one line; and 223, a CPU for supplying instructions concerning distribution of the storage area of the line memory 222, and the weighting amount of the calculator 210.

The principle of a binary conversion method in the fourth embodiment with the above arrangement will be described below.

In the fourth embodiment, binary conversion is performed using the multi-value densities in units of pixels of an input image shown in FIG. 4 (a), the binary-converted image shown in FIG. 4 (b), and the weighting masks shown in FIGS. 4 (c) and 4 (d) in substantially the same manner as in the first embodiment.

More specifically, in the fourth embodiment, input image data $f(i,j)$ is divided into upper-bit data $f_H(i,j)$ and lower-bit data $f_L(i,j)$.

The lower-bit data is binary-converted to 0 or 1 using, as a threshold value, a uniform random number that assumes a value from 0 to 3 at equal probability. The binary-converted lower-bit data $B_L(i,j)$ is added to the upper-bit data $f_H(i,j)$ to obtain quantized data $h(i,j)$.

A weighted average density $m(i,j)$ near the pixel of interest is calculated using already binary-converted pixel data according to the following equation (6):

$$m(i,j) = \Sigma\Sigma R(x,y) \cdot B(i+x, j+y) \qquad (6)$$

The quantized data $h(i,j)$ of the pixel of interest is binary-converted using $m(i,j)$ calculated by the above-mentioned equation, and a binary-conversion correction value $E(i,j)$ assigned to the pixel of interest according to the following equation (7):

$$\text{If } h(i,j) + E(i,j) > m(i,j), \ B(i,j) = 1$$

$$\text{If } h(i,j) + E(i,j) \leq m(i,j), \ B(i,j) = 0 \qquad (7)$$

A correction value for a binary-conversion error generated at that time is simultaneously calculated according to the following equation:

$$E_1(i+1,j) = E_2(i,j+1) = \{h(i,j) + E(i,j) - m(i,j)\}/2 \qquad (8)$$

where $E_1(i+1,j)$ is the correction value assigned to a pixel $(i+1,j)$ next to the pixel of interest, and $E_2(i,j+1)$ is the correction value assigned to a pixel $(i,j+1)$ one line after the pixel of interest.

The binary-conversion correction value $E(i,j)$ assigned to the pixel of interest is given by $E(i,j) = E_1(i,j) + E_2(i,j)$. That is, the value $E(i,j)$ is expressed as a sum of an error $E_1(i,j)$ generated upon binary conversion of a pixel $(i-1,j)$ immediately preceding the pixel of interest and an error $E_2(i,j)$ generated upon binary conversion of a pixel $(i,j-1)$ one line before the pixel of interest by the above-mentioned method.

When the above-mentioned operation is sequentially performed in units of pixels, the entire image is binary-converted.

Since the lower-bit data is quantized using a random number as a threshold value to adequately distribute the density, connection of dots in a low-density portion can be effectively prevented. Since the density serves as a quantization probability, it can be statistically preserved.

An area for storing binary data and an area for storing error correction data are shared, so that for an image including conspicuous granular noise, error correction data is stored with high precision; for an image including conspicuous connection of dots, error correction data is coarsely stored, and binary data is stored in a wide area. Thus, various kinds of images can be reproduced without deterioration image quality, and the memory capacity can also be minimized, thus reducing memory cost.

The binary conversion processing of a pixel (i,j) of interest on the basis of the above-mentioned principle of the binary conversion method in this embodiment with the arrangement shown in FIGS. 7 and 8 will be described below.

Multi-value data f(i,j) of a pixel of interest sent from the correction circuit 103 shown in FIG. 1 is input to the calculator 201. The calculator 201 divides the 8-bit multi-value data f(i,j) into upper-bit data $f_H(i,j)$ and lower-bit data $f_L(i,j)$, and outputs these data. The random number generator 202 generates a uniform random number in units of pixels.

The comparator 203 binary-converts the lower-bit data $f_L(i,j)$ using the random number value as a threshold value, and outputs binary-converted lower-bit data $B_L(i,j)$. The adder 204 adds the upper-bit data $f_H(i,j)$ and the binary-converted lower-bit data $B_L(i,j)$ binary-converted to 1 or 0, and outputs quantized data h(i,j). The adder 205 adds error correction data $E_1(i,j)$ and $E_2(i,j)$ to the quantized data h(i,j) and outputs data h(i,j)+E(i,j).

The line memories 221 and 222 store binary data of pixels which have already been binary-converted before the pixel of interest. The line memory 222 outputs binary data B(i+2,j−1) one line before the pixel of interest upon binary conversion of the pixel of interest, and the line memory 221 outputs binary data B(i+2,j−2) two lines before the pixel of interest upon binary conversion of the pixel of interest.

The D F/Fs 211 to 220 respectively output data delayed by one pixel. More specifically, the D F/F 214 outputs data B(i+1,j−2); the D F/F 213, B(i,j−2); the D F/F 212, B(i−1,j−2); the D F/F 211, B(i−2,j−2); the D F/F 218, B(i+1,j−1); the D F/F 217, B(i,j−1); the D F/F 216, B(i−1,j−1); the D F/F 215, B(i−2,j−1); the D F/F 220, B(i−1,j); and the D F/F 219, B(i−2,j). These delayed pixel data are input to the calculator 210.

The calculator 210 calculates a weighted average density value m(i,j) on the basis of the weighting masks using these input binary data near the pixel of interest, and outputs it as a threshold value. The subtracter 206 calculates a difference between the output h(i,j)+E(i,j) from the adder 205 and m(i,j) from the calculator 210.

The comparator 209 binary-converts h(i,j)+E(i,j) from the adder 205 using m(i,j) from the calculator 210 as a threshold value, and outputs binary-converted binary data B(i,j). The binary data B(i,j) from the comparator 209 is supplied to a printer 105, and is also input to the line memory 221 and the D F/F 220 as surrounding pixel data upon binary conversion of the next pixel of interest.

The data h(i,j)+E(i,j)−m(i,j) output from the subtracter 206 is input to the error ROM 207. The error ROM 207 outputs error data $E_1(i+1,j)$ and $E_2(i,j+1)$ according to equation (8) described above.

The error data $E_1(i+1,j)$ is delayed by one pixel by the D F/F 208, and is assigned to a pixel (i+1,j). The error data $E_2(i,j+1)$ is stored in the line memory 220, and is assigned to a pixel (i,j+1) one line after the pixel of interest.

When the series of processing operations are repetitively executed, binary conversion processing of image data is sequentially performed in units of pixels.

In this embodiment, the CPU 223 changes processing parameters and the assignment of the storage area of the line memory 222 between a "general image" including from a low-density portion to a high-density portion, and a "uniform image" including a wide specific halftone area.

In the case of the "general image", the CPU 223 instructs the calculator 201 to divide image data into upper 4-bit data and lower 4-bit data. The CPU 223 controls the random number generator 202 to generate a uniform random number that assumes a value ranging between 0 and 15. In this case, the line memory 222 stores 2-bit error correction data, and 1-bit binary data. The calculator 210 selects the mask $R_1$ shown in FIG. 4 (c) to calculate a weighted average value.

On the other hand, in the case of the "uniform image", since granular noise becomes conspicuous, the CPU 223 controls to eliminate the influence of the random number. More specifically, the CPU 223 controls the calculator 201 to divide image data into upper 5-bit data and lower 3-bit data, and controls the random number generator 202 to generate a uniform random number that assumes a value ranging between 0 and 7. The CPU 223 controls the line memory 222 to store 3-bit error correction data, and does not store binary data. The calculator 210 selects the mask $R_2$ shown in FIG. 4 (d) to calculate a weighted average value.

As described above, according to the fourth embodiment, since lower-bit data of a pixel of interest is stochastically quantized, the data is added to its upper-bit data, and then the sum is binary-converted, connection of dots occurring in a low-density portion can be prevented, and a high-quality image can be obtained.

The area for storing binary data and the area for storing error correction data are shared, and are constituted by one memory. The ratio of these storage areas of the memory is changed according to processing, so that the memory capacity can be reduced without deteriorating image quality of various kinds of images.

[Fifth Embodiment]

Figure 9:
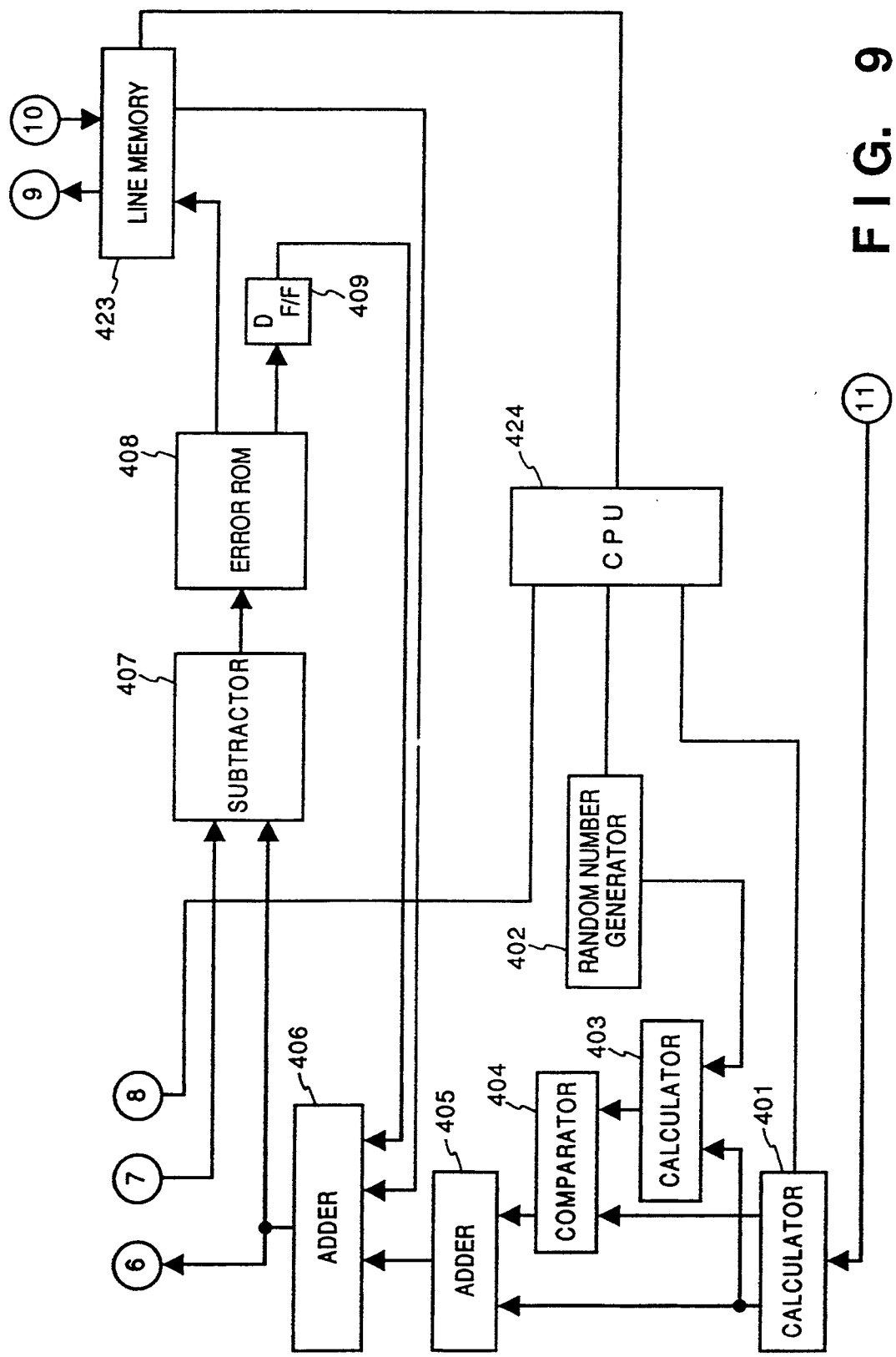
FIGS. 9 and 10 are block diagrams showing the details of the arrangement of a binary conversion circuit according to the fifth embodiment of the present invention.
Figure 10:
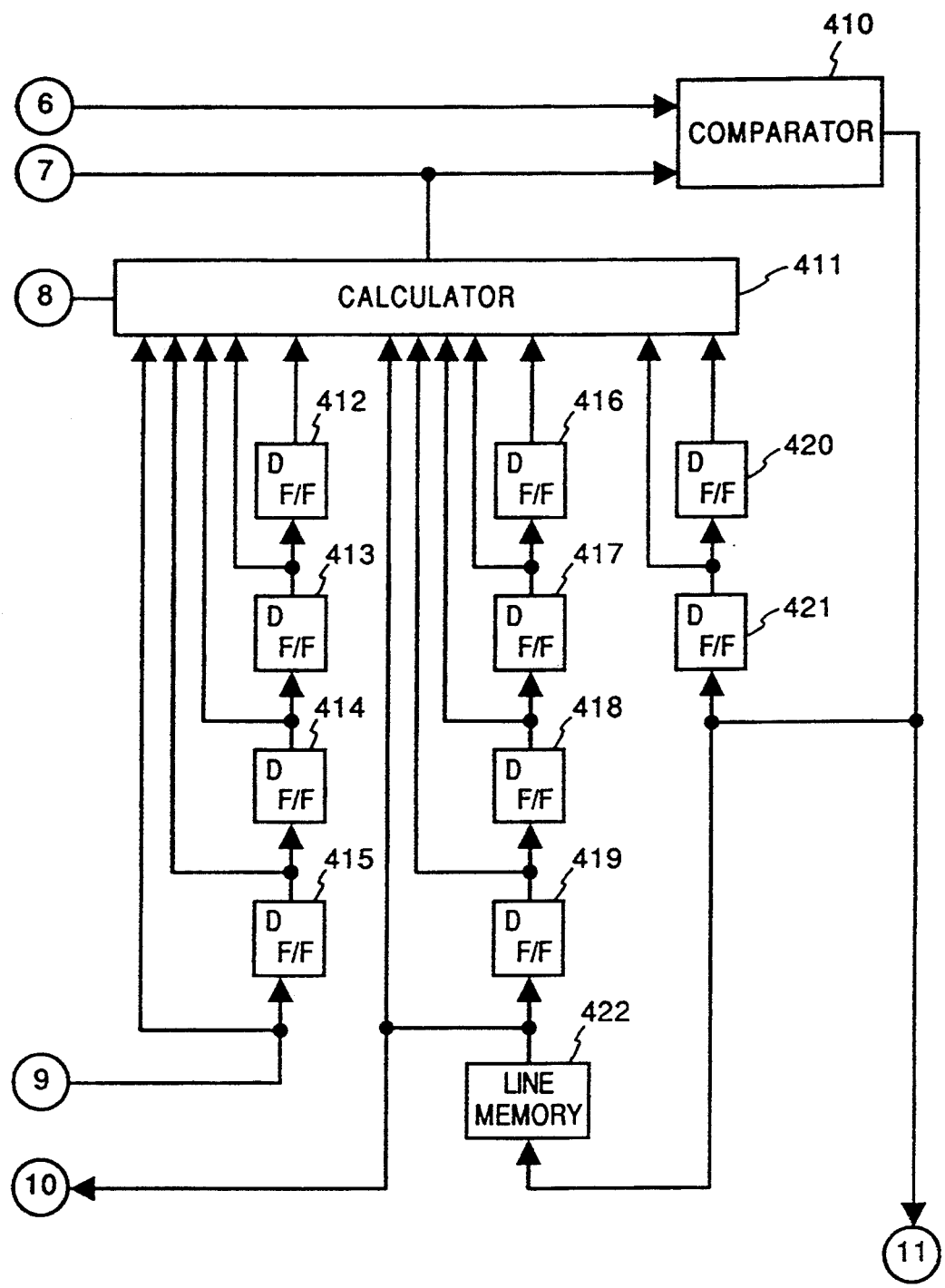

FIGS. 9 and 10 are block diagrams showing the details of the arrangement of a binary conversion circuit according to the fifth embodiment of the present invention. In the fifth embodiment of the present invention, a random number is processed according to the level of upper-bit data of a pixel of interest.

As shown in FIGS. 9 and 10, after multi-value data of a pixel of interest is divided into upper- and lower-bit data by a calculator 401, the upper-bit data is input to a calculator 403 together with a random number value generated by a random number generator 402. The calculator 403 processes the random number value according to the value of the upper-bit data.

More specifically, in a low-density portion where the upper-bit data becomes 0, the random number value as the threshold value of binary conversion of the lower-bit data is increased to decrease the pixel print probability, thereby further suppressing connection of dots in a highlight portion.

As described above, according to the present invention, since lower-bit data of a pixel of interest is stochastically binary-converted, image quality of a highlight portion can be improved, and image quality of a low-density portion can also be improved.

Since the storage areas are shared by the binary data memory means and the error memory means, and the ratio of the areas is changed according to processing, high-quality images can be obtained for various kinds of images, and an efficient memory arrangement can be realized.

[Sixth Embodiment]

The sixth embodiment of the present invention will be described in detail below with reference to the accompanying drawings.

The sixth embodiment has substantially the same arrangement as that of the above-mentioned first embodiment, except for only an arrangement of a binary conversion circuit 104. The binary conversion circuit of this embodiment has an arrangement shown in FIGS. 11 and 12.

Figure 12:
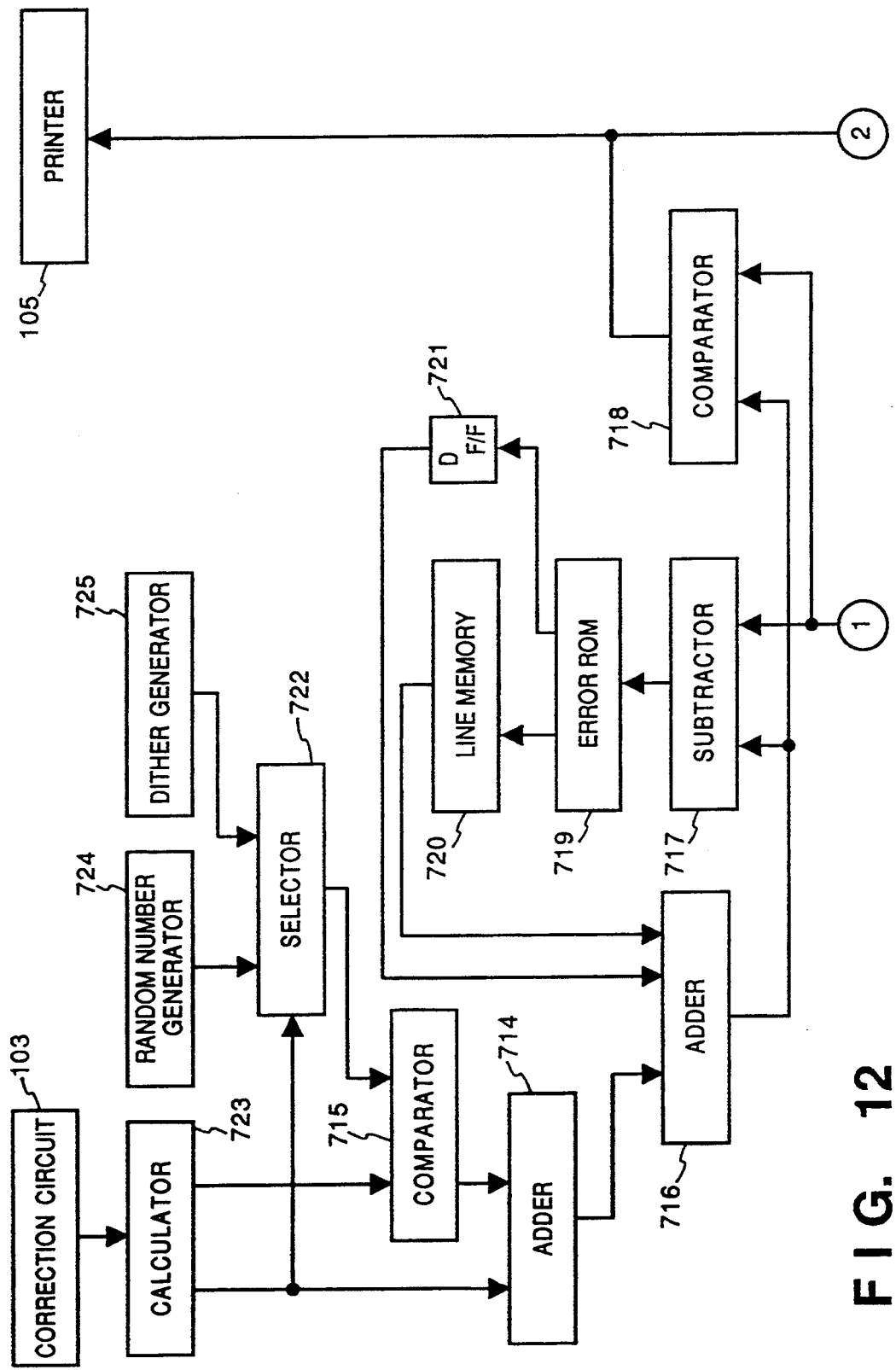

In FIGS. 11 and 12, reference numerals 701 and 702 denote line memories each for storing binary-converted binary image data for one line; 703 to 712 and 721, D-type flip-flops (D F/Fs) each for delaying image data by one pixel; 713, a calculator for calculating a weighted average value of a predetermined area from binary image data near a pixel of interest; 714, an adder for adding binary-converted lower-bit data to upper-bit data of a pixel, and outputting quantized data; and 715, a comparator for comparing a threshold value sent from a selector 722 with lower-bit data of pixel data to binary-convert the lower-bit data of the pixel data.

Reference numeral 716 denotes an adder for adding error data for density correction to quantized data; 717, a subtracter for calculating a difference between the weighted average value output from the calculator 713 and quantized data of a pixel of interest; 718, a comparator, using the weighted average value output from the calculator 713 as a threshold value, for comparing the threshold value and the quantized data of the pixel of interest so as to binary-convert the pixel of interest; 719, an error ROM for calculating error data on the basis of the difference between the quantized data of the pixel of interest and the weighted average value output from the calculator 713, which difference is output from the subtracter 717; and 720, a line memory for storing the calculated error data from the error ROM 719 for one line.

Reference numeral 722 denotes a selector for selecting on the basis of the upper-bit data of the pixel of interest whether a random number generated by a random number generator 724 is output as a threshold value or a dither threshold value output from a dither generator 725 is output as a threshold value; 723, a calculator for dividing multi-value pixel data input from a correction circuit 103 into upper- and lower-bit data; 724, a random number generator for generating a uniform random number in units of pixels; and 725, a dither generator for generating a dither threshold value on the basis of a dither matrix according to the pixel position.

The principle of a binary conversion method in the sixth embodiment with the above-mentioned arrangement will be described below.

In the sixth embodiment, binary conversion is performed using the multi-value densities of an input image in units of pixels shown in FIG. 4 (a), the binary-converted image shown in FIG. 4 (b), and the weighting mask shown in FIG. 4 (c) like in the first embodiment and the like.

Figure 13:
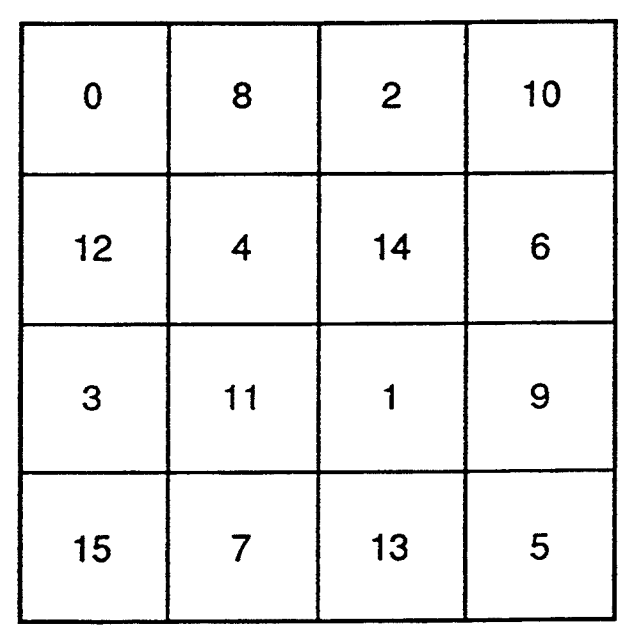

Input image data f(i,j) is divided into upper 4-bit data $f_H(i,j)$ and lower 4-bit data $f_L(i,j)$. In a highlight portion where the upper-bit data $f_H(i,j)$ becomes 0, the lower-bit data is binary-converted to 0 or 1 using, as a threshold value, a uniform random number that assumes a value ranging between 0 and 15 at equal probability. In a portion where the upper-bit data $f_H(i,j)$ becomes 1, i.e., granular noise is conspicuous, the lower-bit data is binary-converted using, as a threshold value, a 4×4 dither matrix, as shown in FIG. 13.

In a portion where the upper-bit data assumes a value ranging between 2 to 15, i.e., dither texture noise is conspicuous, the lower-bit data $f_L(i,j)$ is binary-converted to 0 or 1 using the uniform random number as a threshold value as in the highlight portion. The binary-converted lower-bit data $B_L(i,j)$ is added to the upper-bit data $f_H(i,j)$ to obtain quantized data h(i,j).

A weighted average density m(i,j) near the pixel of interest is calculated from already binary-converted pixel data according to the following equation (9):

$$m(i,j) = \sum_{X=-2}^{0} \sum_{Y=-2}^{2} R(x,y) \cdot B(i+x, j+y) \quad (9)$$

The quantized data h(i,j) of the pixel of interest is binary-converted using the m(i,j) calculated by the above equation and a binary-conversion correction value E(i,j) assigned to the pixel of interest according to the following equation (10). That is, If $h(i,j)+E(i,j) > m(i,j)$, $B(i,j)=1$ If $h(i,j)+E(i,j) \leq m(i,j)$, $B(i,j)=0$ \quad (10)

A binary-conversion error generated at that time is simultaneously calculated according to the following equation (11):

$$E_1(i+1,j) = E_2(i,j+1) = \{h(i,j)+E(i,j)-m(i,j)\}/2 \quad (11)$$

where $E_1(i+1,j)$ is the correction value assigned to a pixel (i+1,j) next to the pixel of interest, and $E_2(i,j+1)$ is the correction value assigned to a pixel (i,j+1) one line after the pixel of interest.

The binary-conversion correction value E(i,j) assigned to the pixel of interest is given by $E(i,j)=E_1(i,j)+E_2(i,j)$. That is, the value E(i,j) is expressed as a sum of an error $E_1(i,j)$ generated upon binary conversion of a pixel (i−1,j) immediately preceding the pixel of interest and an error $E_2(i,j)$ generated upon binary conversion of a pixel (i,j−1) one line before the pixel of interest by the above-mentioned method.

When the above-mentioned operation is sequentially performed in units of pixels, the entire image is binary-converted.

In this manner, at a density at which regular texture noise is conspicuous as in a highlight portion, lower-bit data is quantized using a random number as a threshold value, and in a density area where random granular noise is conspicuous, lower-bit data is quantized using a dither threshold value, thereby preventing connection of dots in a low-density portion, and preventing generation of texture noise or granular noise in the corresponding density area. Since lower-bit data is quantized using density as a quantization probability, the density can be statistically preserved. Since upper-bit data is binary-converted on the basis of surrounding pixel data, and its binary conversion error is corrected, the density is preserved, and an image having good gradation characteristics and a high resolution can be obtained. Since a binary-conversion error correction value need only be stored in correspondence with the number of upper bits, the memory capacity can be saved.

An operation upon binary conversion of a pixel (i,j) of interest in the arrangement based on the binary-conversion principle of this embodiment described above will be described below.

The line memories 701 and 702 shown in FIGS. 11 and 12 store binary data from the comparator 718, which have already been binary-converted before the pixel of interest.

Upon binary conversion of the pixel of interest, the line memory 702 outputs binary data B(i+2,j−1) one line before the pixel of interest, and the line memory 701 outputs binary data B(i+2,j−2) two lines before the pixel of interest.

The D F/Fs 703 to 712 respectively output data delayed by one pixel.

More specifically, the D F/F 703 outputs data B(i+1,j−2); the D F/F 704, B(i,j−2); the D F/F 705, B(i−1,j−2); the D F/F 706, B(i−2,j−2); the D F/F 707, B(i+1,j−1); the D F/F 708, B(i,j−1); the D F/F 709, B(i−1,j−1); the D F/F 710, B(i−2,j−1); the D F/F 711, B(i−1,j); and the D F/F 712, B(i−2,j).

Binary data from these D F/Fs 703 to 712 are input to the calculator 713. The calculator 713 calculates a weighted average density value m(i,j) indicated by reference symbol A from binary data near the pixel of interest on the basis of the weighting mask, and outputs it to the subtracter 717 and the comparator 718.

The adder 714 adds upper-bit data $f_H(i,j)$ and binary-converted lower-bit data $B_L(i,j)$ binary-converted to 1 or 0, and outputs quantized data h(i,j).

The comparator 715 compares a threshold value selected by the selector 722 and lower 4-bit data $f_L(i,j)$ to binary-convert the lower 4-bit data $f_L(i,j)$, and outputs binary-converted lower-bit data $B_L(i,j)$.

When the upper-bit data $f_H(i,j)$ is 0 or has a value ranging between 2 and 15, the selector 722 selects a random number threshold value from the random number generator 724 as a threshold value; when the upper-bit data $f_H(i,j)$ is 1, it selects a dither threshold value from the dither generator 725 as a threshold value.

Multi-value data f(i,j) of the pixel of interest supplied from the correction circuit 103 is input to the calculator 723. The calculator 723 divides the input 8-bit multi-value data of the pixel of interest into upper 4-bit data $f_H(i,j)$ and lower 4-bit data $f_L(i,j)$, and outputs these data. The random number generator 724 generates a uniform random number that assumes a value ranging between 0 and 15 in units of pixels. The dither generator 725 generates a dither threshold value based on a dither matrix according to the pixel position.

The adder 716 adds error correction data $E_1(i,j)$ and $E_2(i,j)$ to the quantized data h(i,j), and outputs h(i,j)+E(i,j). The subtracter 717 calculates a difference between h(i,j)+E(i,j) and m(i,j). The comparator 718 binary-converts h(i,j)+E(i,j) using m(i,j) as a threshold value, and outputs binary data B(i,j). The binary data B(i,j) from the comparator 718 is supplied to a printer 105.

The binary data B(i,j) is also input to the line memory 702 and the D F/F 711 as surrounding pixel data for a pixel to be binary-converted in future.

The data h(i,j)+E(i,j)−m(i,j) output from the subtracter 717 is input to the error ROM 719. The error ROM 719 outputs error data $E_1(i+1,j)$ and $E_2(i,j+1)$ according to equation (11) described above. $E_1(i+1,j)$ is delayed by the D F/F 721 by one pixel, and is assigned to a pixel (i+1,j). $E_2(i,j+1)$ is stored in the line memory 720, and is assigned to a pixel (i,j+1) one line after the pixel of interest.

When the series of processing operations are repetitively executed, binary conversion processing of image data is sequentially performed in units of pixels.

As described above, according to this embodiment, in a highlight portion, since lower-bit data of pixel data is stochastically quantized, binary conversion, which has been performed using only surrounding pixel data, can be adequately distributed, and deterioration of image quality caused by connection of dots can be prevented. At a middle density where granular noise tends to be conspicuous, since lower-bit data of pixel data is quantized using a dither threshold value, generation of granular noise can be suppressed.

[Seventh Embodiment]

The seventh embodiment of the present invention will be described in detail below with reference to FIGS. 14 and 15.

The basic arrangement of the seventh embodiment is substantially the same as that of the first embodiment shown in FIG. 1, except for the arrangement of a binary conversion circuit 104. FIGS. 14 and 15 show the details of the arrangement of a binary conversion circuit according to the seventh embodiment.

The same reference numerals in the seventh embodiment denote the same parts as in the binary conversion circuit of the sixth embodiment shown in FIGS. 11 and 12, and a detailed description thereof will be omitted.

Figure 14:
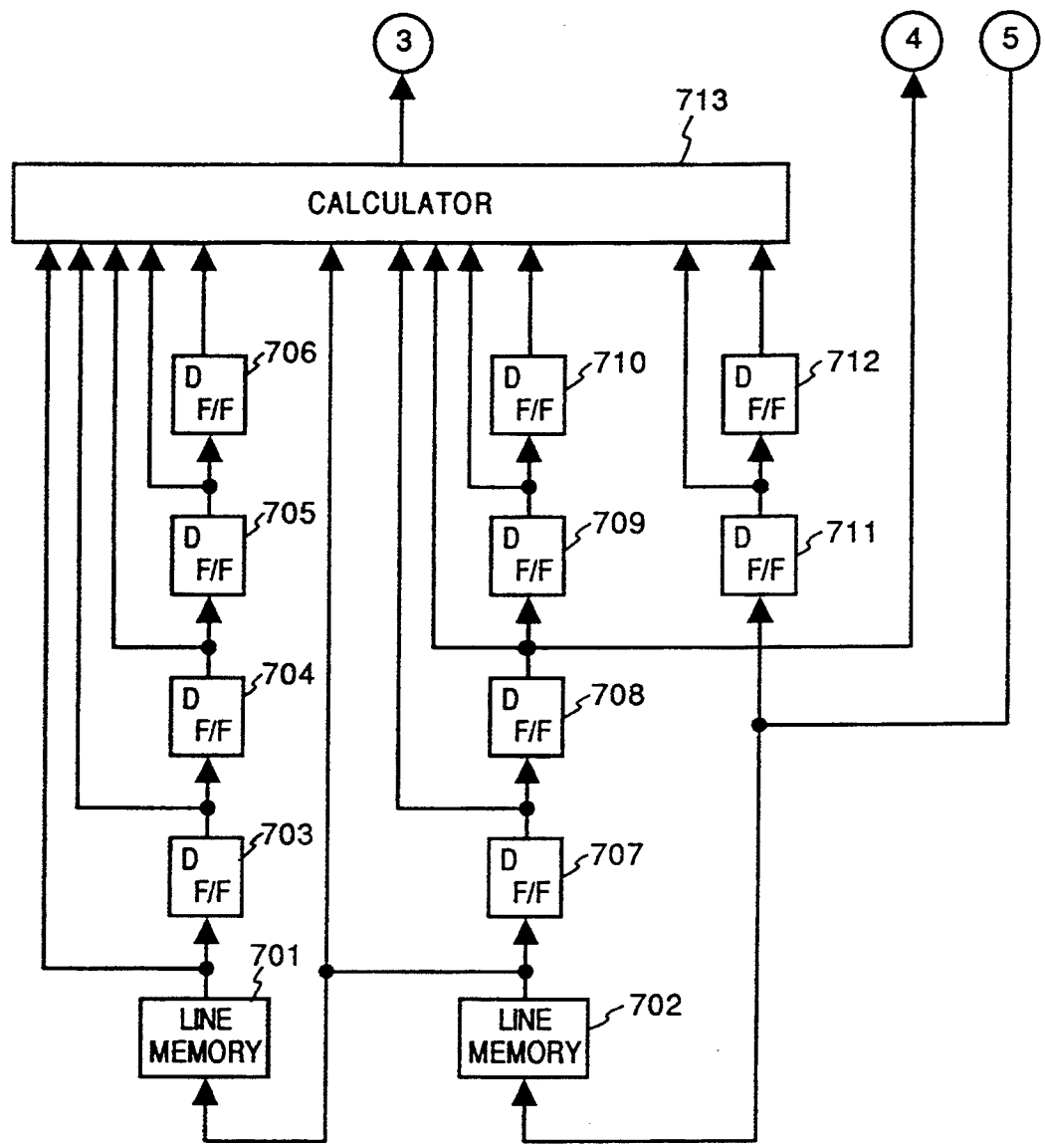

In FIGS. 14 and 15, a difference from the sixth embodiment shown in FIGS. 11 and 12 is as follows.

In the sixth embodiment, the binary-conversion error correction value as the output from the error ROM 719, i.e., the value $E_2$, including a sign, of $E_1(i+1,j)=E_2(i,j+1)=\{h(i,j)+E(i,j)-m(i,j)\}/2$, is stored in the line memory 720 fox one line since the value $E_2$ can be a negative value. The output from the line memory 720 is directly input to the adder 716.

However, in the seventh embodiment shown in FIGS. 14 and 15, the output from the error ROM 719 is input to a line memory 750, and only the absolute value of the value $E_2$ is stored in the line memory 750. The output from the line memory 750 is input to one input terminal of a calculator 756, and the other input terminal of the calculator 756 receives the output from the D F/F 708. For this reason, the capacity of the line memory 750 can be smaller than that of the line memory 720.

A sign is added by the calculator 756 to the correction value $E_2(i,j)$ to be added to a pixel (i,j), and the correction value is then supplied to the adder 716. The calculator 756 adds a positive sign when B(i,j−1)=1; it adds a negative sign when B(i,j−1)=0. Since the value of B(i,j−1) is determined according to the relationship between h(i,j−1)+E(i,j−1) and m(i,j−1), it has a correspondence with the sign of the value $E_2(i,j)$.

With the above-mentioned arrangement, the memory capacity of the line memory 750 can be saved.

[Eighth Embodiment]

The eighth embodiment of the present invention will be described in detail below with reference to FIGS. 16 and 17.

The basic arrangement of the eighth embodiment is substantially the same as that of the first embodiment shown in FIG. 1, except for the arrangement of a binary conversion circuit 104. FIGS. 16 and 17 show the details of the arrangement of a binary conversion circuit according to the eighth embodiment. The same reference numerals in the eighth embodiment denote the same parts as in the binary conversion circuit of the sixth embodiment shown in FIGS. 11 and 12, and a detailed description thereof will be omitted.

The eighth embodiment adopts an error diffusion method in place of using the error ROM 719.

Figure 16:
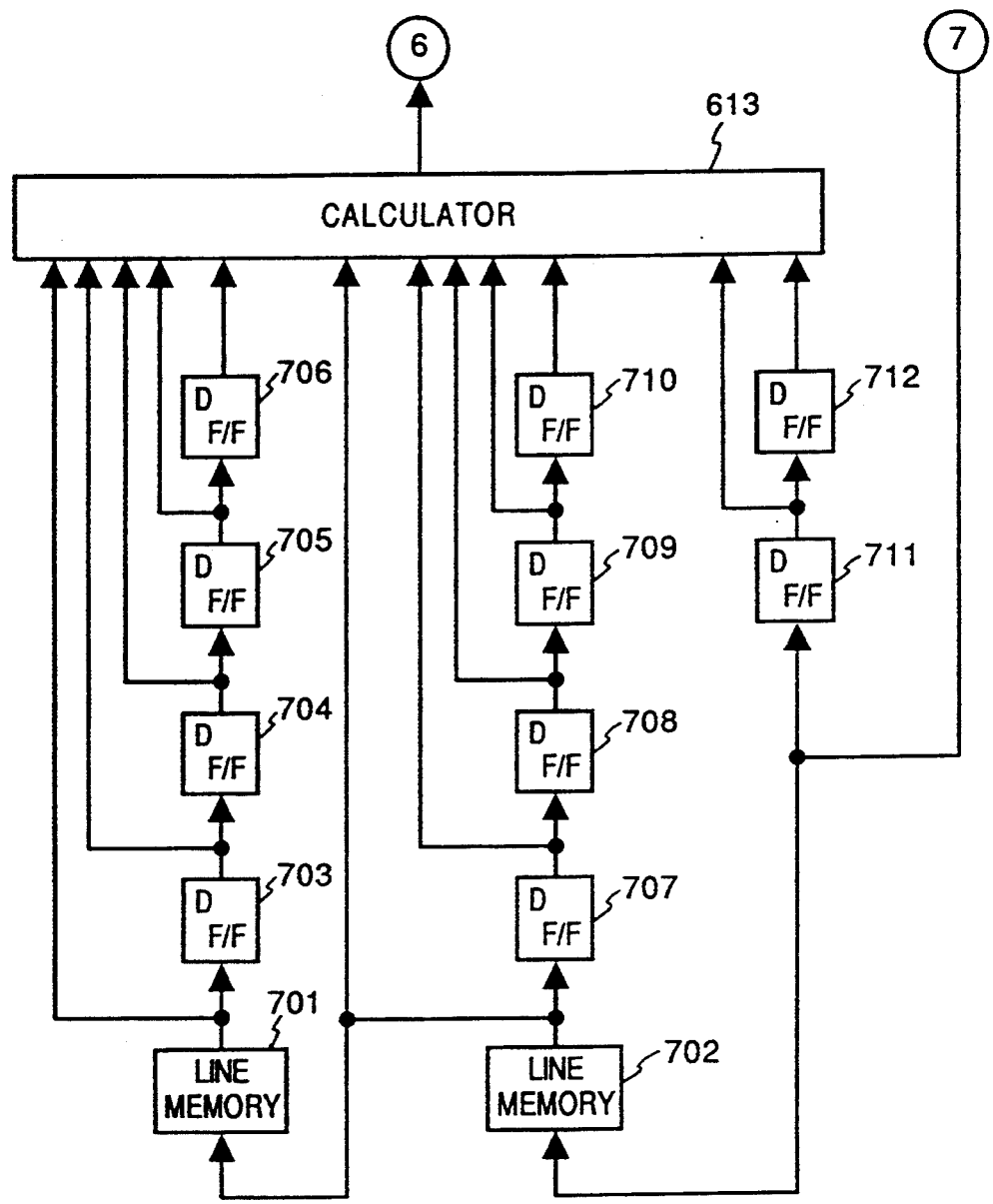
FIGS. 16 and 17 are block diagrams showing the details of the arrangement of a binary conversion circuit according to the eighth embodiment of the present invention.
Figure 17:
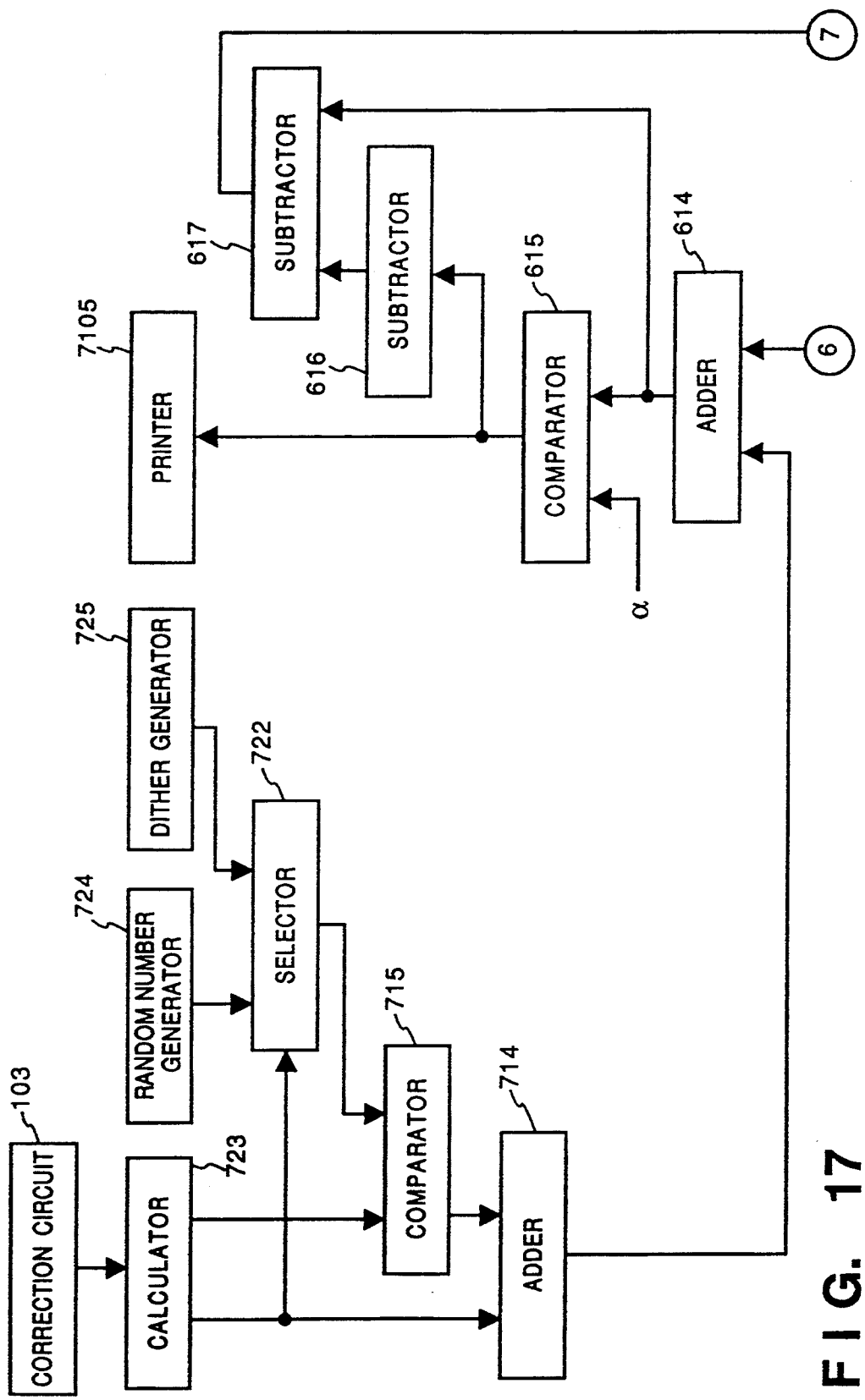

In FIGS. 16 and 17, a difference from the sixth embodiment shown in FIGS. 11 and 12 is as follows.

That is, reference numeral 613 denotes a calculator for outputting an accumulated error Err(i,j) of already binary-converted pixels; 614, an adder for adding the accumulated error to quantized data; 615, a comparator for binary-converting the error-corrected quantized data using a predetermined value $\alpha$ as a threshold value; 616, a multiplier for multiplying binary data with a predetermined value; and 617, a subtracter for calculating a difference between the error-corrected quantized data and the binary-converted data.

A case will be described below wherein a pixel of interest is binary-converted with the above-mentioned arrangement.

Input data f(i,j) of a pixel of interest is divided into upper- and lower-bit data by a calculator 723. A random number generator 724 outputs a random number value, and a dither generator 725 generates a dither threshold value according to the pixel position. A selector 722 selects one of the random number value and the dither threshold value on the basis of the value of the upper-bit data. A comparator 715 binary-converts data on the basis of the selected threshold value. An adder 714 adds the binary-converted lower-bit data to the upper-bit data, and outputs quantized data h(i,j).

The arrangement and operations of these components are the substantially the same as those in the sixth embodiment.

The calculator 613 outputs an accumulated error Err(i,j) of already binary-converted pixels. The adder 614 adds the error Err(i,j) to the quantized data h(i,j). The comparator 615 binary-converts data h(i,j)+Err(i,j) using the predetermined value $\alpha$ as a threshold value according to the following conditions:

If $h(i,j)+Err(i,j)>\alpha$, $B(i,j)=1$

If $h(i,j)+Err(i,j)\leq\alpha$, $B(i,j)=0$

The binary-converted signal B(i,j) from the comparator 615 is output to a printer 705, and is also input to the multiplier 616. The multiplier 616 multiplies the input binary-converted data B(i,j) with a maximum value $D_{max}$ that the quantized data h(i,j) can assume, and outputs the product to the subtracter 617. The subtracter 617 calculates a binary-conversion error e(i,j) according to the following equation, and outputs it to a D F/F 711.

$$e(i,j)=h(i,j)+Err(i,j)-D_{max}B(i,j)$$

Note that e(i,j) is delayed by line memories 701 and 702, and D F/Fs 703 to 712, and serves as the basis of accumulated error data for a pixel of interest to be binary-converted later.

The accumulated error is calculated as follows using a 5×3 weighting coefficient matrix S:

$$Err(i,j) = \sum_{X=-2}^{0} \sum_{Y=-2}^{2} S(x,y) \cdot e(i+x, j+y)$$

Thereafter, the above-mentioned processing is repeated to sequentially binary-convert pixels.

As described above, according to the eighth embodiment, like in the sixth embodiment, in a highlight portion, since lower-bit data of pixel data is stochastically quantized, binary conversion, which has been performed using only surrounding pixel data, can be adequately distributed, and deterioration of image quality caused by connection of dots can be prevented. At a middle density where granular noise tends to be conspicuous, since lower-bit data of pixel data is quantized using a dither threshold value, generation of granular noise can be suppressed.

According to each of the sixth to eighth embodiments described above, in a highlight portion, since lower-bit data of pixel data is stochastically quantized, binary conversion, which has been performed using only surrounding pixel data, can be adequately distributed, and deterioration of image quality caused by connection of dots can be prevented.

At a middle density where granular noise tends to be conspicuous, since lower-bit data of pixel data is quantized using a dither threshold value, generation of granular noise can be suppressed. Since the density is statistically preserved, gradation characteristics can be prevented from being impaired. In addition, since error correction is performed using only upper-bit data, the memory capacity can be saved.

More specifically, an image processing apparatus comprises selection means for selecting a binary conversion method on the basis of a value of upper-bit data of multi-value image data, binary-conversion means for binary-converting lower-bit data of the multi-value image data by the selected binary conversion method, and another binary-conversion means for binary-converting the multi-value image data, quantized upon binary conversion of the lower-bit data, using a binary conversion method different from the binary conversion method of the lower-bit data.

As described above, according to the present invention, since lower-bit data of a pixel of interest is quantized by selectively using a simple binary conversion method having regular or random characteristics according to the density area, deterioration of image quality caused by regular texture noise can be prevented, and deterioration of image quality caused by granular noise can also be prevented.

Furthermore, according to the present invention, the capacity of a memory for storing a binary-conversion correction value can be saved.

[Ninth Embodiment]

The ninth embodiment of the present invention will be described below. In this embodiment, multi-value image data is ternary-converted using the density values of surrounding pixels, and uniformly generated two random number values.

Figure 18:
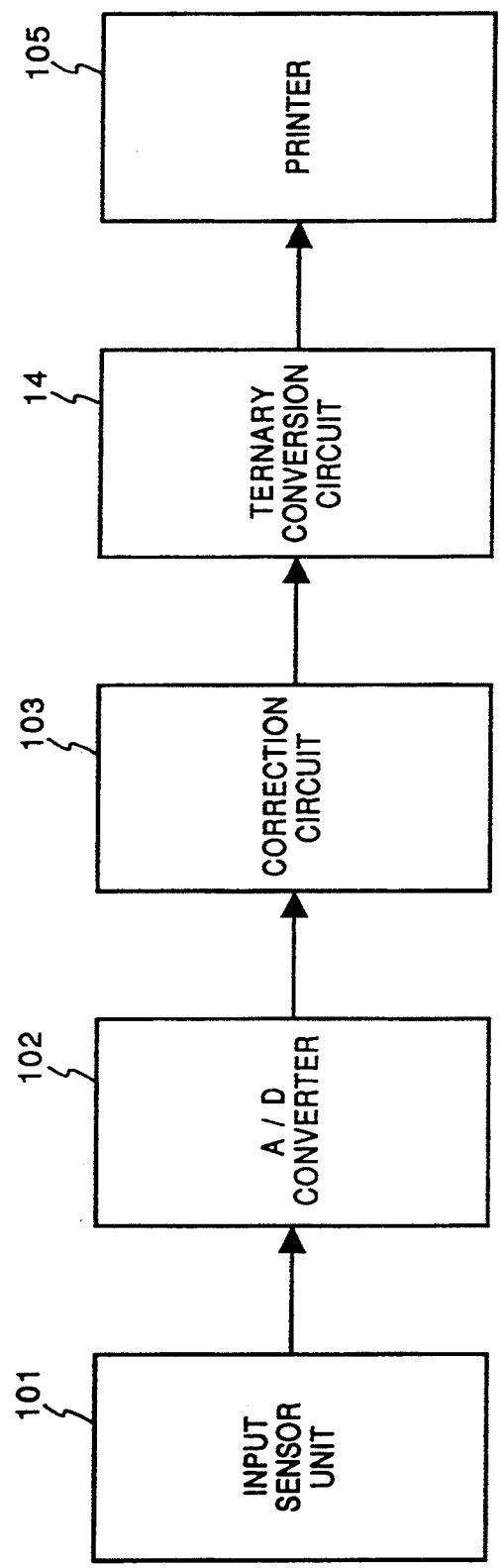
FIG. 18 is a block diagram showing an arrangement of an image processing apparatus according to the ninth embodiment of the present invention.

FIG. 18 is a block diagram showing an image processing apparatus according to the ninth embodiment of the present invention.

The same reference numerals in FIG. 18 denote the same parts as in the arrangement of the above-mentioned first embodiment shown in FIG. 1.

An input sensor unit 101 comprises a photoelectric conversion element such as a CCD, and a driver for driving the CCD, and performs an original reading operation. Original image data read by the input sensor unit 101 is multi-value analog image data. The multi-value analog image data is sequentially supplied to an A/D converter 102, and analog data of respective pixels are converted into corresponding multi-value digital data. Then, a correction circuit 103 performs correction processing, e.g., shading correction for correcting sensitivity nonuniformity of the CCD sensor and illuminance nonuniformity of an illumination light source.

Multi-value image data input to a ternary conversion circuit 114 is quantized to ternary data by a ternary conversion method (to be described later). A printer 105 is of a laser beam type or an ink-jet type, and reproduces an image on a recording sheet on the basis of ternary data supplied from the ternary conversion circuit 114.

Figure 19:
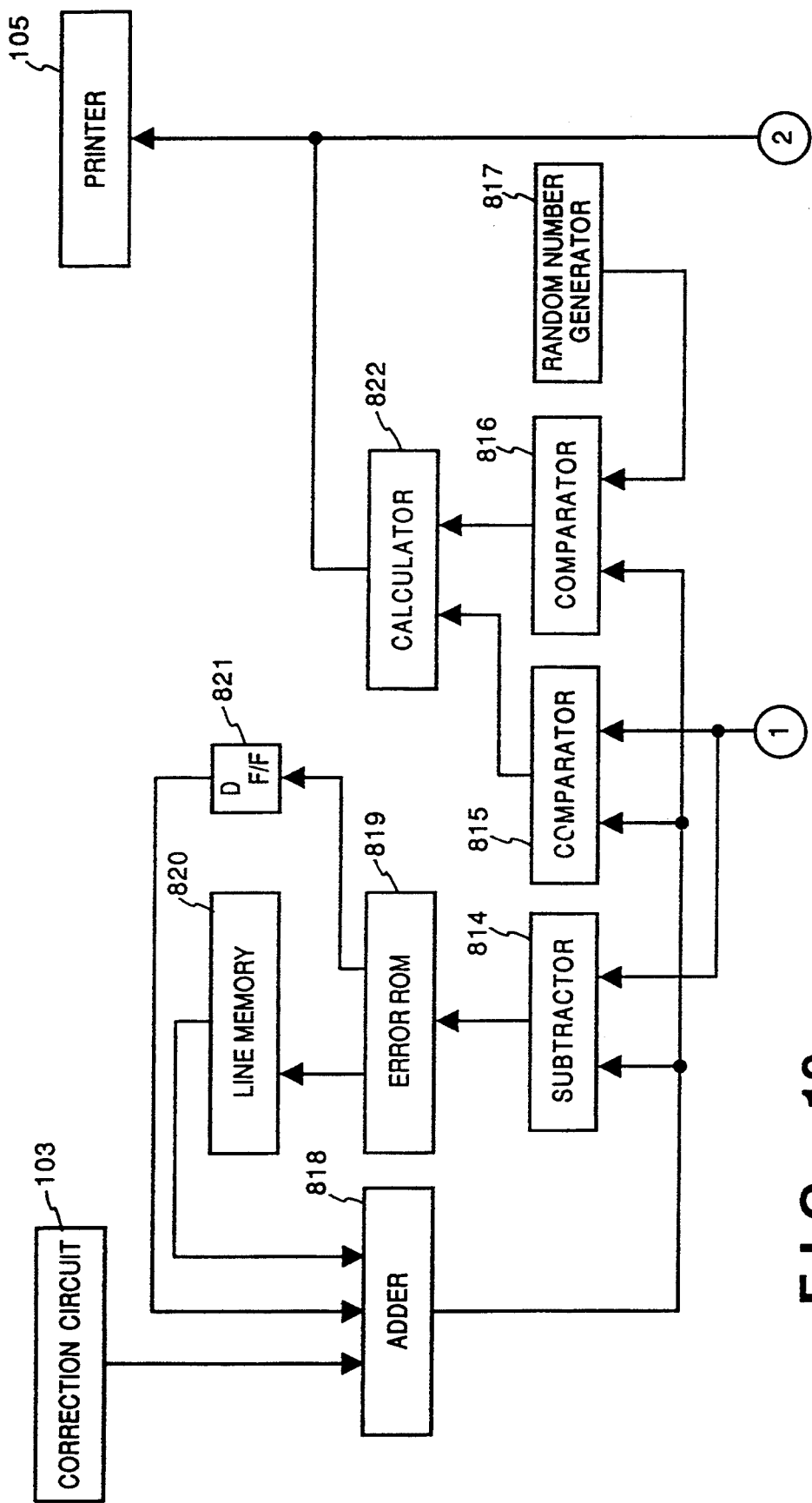
FIG. 19 is a block diagram showing the details of the arrangement of a ternary conversion circuit shown in FIG. 18, and showing a difference from the arrangement of the sixth embodiment.

FIG. 19 shows an arrangement, different from that of the binary conversion circuit of the sixth embodiment described above, of the detailed block arrangement of the ternary conversion circuit 114 shown in FIG. 18. In the ternary conversion circuit 114, a difference from the binary conversion circuit 104 of the sixth embodiment shown in FIGS. 11 and 12 is the arrangement shown in FIG. 12, and the ninth embodiment comprises the arrangement shown in FIG. 19 in place of the arrangement shown in FIG. 12. In the ternary conversion circuit of the ninth embodiment shown in FIGS. 11 and 19, reference numerals 701 and 702 denote line memories each for storing ternary image data for one line; and 703 to 712, and 721, D F/Fs (flip-flops) each for delaying image data by one pixel. Reference numeral 713 denotes a calculator for calculating a weighted average value of a predetermined area from ternary image data near a pixel of interest.

In FIG. 19, reference numeral 814 denotes a subtracter for calculating a difference between the weighted average value output from the calculator 713 and multi-value data of a pixel of interest; 815, a comparator for comparing the weighted average value and the multi-value data of the pixel of interest; 816, a comparator for comparing a random number value output from a random number generator 817 and the multi-value data of the pixel of interest; and 817, a random number generator for generating a uniform random number in units of pixels. Reference numeral 818 denotes an adder for adding error data for density correction to the multi-value data of the pixel of interest; 819, an error ROM for calculating error data on the basis of the difference between the weighted average value and the multi-value data of the pixel of interest output from the subtracter 814; and 820, a line memory for storing error data for one line.

The principle of ternary conversion in this embodiment with the above-mentioned arrangement will be described below. In the ninth embodiment, a weighted average density $m(i,j)$ near a pixel of interest is calculated using already ternary-converted pixel data according to the weighting mask shown in FIG. 4 (c).

$$m(i,j) = \Sigma\Sigma R(x,y) \cdot T(i+x, j+y)$$

Multi-value data $f(i,j)$ of the pixel of interest is ternary-converted according to the following conditions using the calculated $m(i,j)$, a uniform random number $ran(i,j)$ generated in units of pixels, and a ternary-conversion error correction value $E(i,j)$ assigned to the pixel of interest:

If $f(i,j)+E(i,j) \leq m(i,j)$, $T(i,j)=0$

If $ran(i,j) > f(i,j)+E(i,j) > m(i,j)$, $T(i,j)=1$

If $ran(i,j) \leq f(i,j)+E(i,j)$, $T(i,j)=2$ for which, when $ran(i,j) \leq m(i,j)$ if $f(i,j)+E(i,j) \leq m(i,j)$, $T(i,j)=0$ if $f(i,j)+E(i,j) > m(i,j)$, $T(i,j)=2$ A correction value of a ternary-conversion error generated at that time is simultaneously calculated.

$$E_1(i+1,j) = E_2(i,j+1) = \{f(i,j)+E(i,j)-m(i,j)\}/2$$

where $E_1(i+1,j)$ is the correction value assigned to a pixel $(i+1,j)$ next to the pixel of interest, and $E_2(i,j+1)$ is the correction value assigned to a pixel $(i,j+1)$ one line after the pixel of interest.

The error correction value $E(i,j)$ assigned to the pixel of interest is given by $E(i,j) = E_1(i,j) + E_2(i,j)$, i.e., is expressed as a sum of an error $E_1(i,j)$ generated upon ternary conversion of a pixel $(i-1,j)$ immediately preceding the pixel of interest and an error $E_2(i,j)$ generated upon ternary conversion of a pixel $(i,j-1)$ one line before the pixel of interest by the above-mentioned method.

In this manner, since ternary conversion is performed using two threshold values, i.e., a regular conditional threshold value and a randomly generated random number threshold value, regular texture noise and random granular noise can be prevented.

An operation upon ternary conversion of a pixel $(i,j)$ of interest with the arrangement shown in FIGS. 11 and 19 based on the above-mentioned principle will be described below.

The line memories 701 and 702 store ternary data which have already been ternary-converted before the pixel of interest. Upon ternary conversion of the pixel of interest, the line memory 702 outputs ternary data $T(i+2, j-1)$ one line before the pixel of interest, and the line memory 701 outputs ternary data $T(i+2, j-2)$ two lines before the pixel of interest.

More specifically, the D F/F 703 outputs data $T(i+1, j-2)$; the D F/F 704, $T(i, j-2)$; the D F/F 705, $T(i-1, j-2)$; the D F/F 706, $T(i-2, j-2)$; the D F/F 707, $T(i+1, j-1)$; the D F/F 708, $T(i, j-1)$; the D F/F 709, $T(i-1, j-1)$; the D F/F 710, $T(i-2, j-1)$; the D F/F 711, $T(i-1, j)$; and the D F/F 712, $T(i-2, j)$.

These ternary data are input to the calculator 713. The calculator 713 calculates a weighted average density $m(i,j)$ based on the weighting mask shown in FIG. 4(c) using ternary data near the pixel of interest.

Multi-value data $f(i,j)$ of the pixel of interest from the correction circuit 103 is input to the adder 818. The adder 818 adds error correction data $E_1(i,j)$ and $E_2(i,j)$ to the multi-value data of the pixel of interest, and outputs data $f(i,j)+E(i,j)$. The subtracter 814 calculates a difference between $f(i,j)+E(i,j)$ and $m(i,j)$. The comparator 815 compares $f(i,j)+E(i,j)$ and $m(i,j)$, and outputs a judgment signal $B_1(i,j)$. The random number generator 817 generates a uniform random number in units of pixels. The comparator 816 compares the random number value and $f(i,j)+E(i,j)$, and outputs a judgment signal $B_2(i,j)$.

A calculator 822 calculates ternary data $T(i,j)$ on the basis of the comparison judgment signals $B_1(i,j)$ and $B_2(i,j)$. The calculated ternary data $T(i,j)$ is supplied to a printer 105, and the like as quantized data, and is also supplied to the D F/F 711 shown in FIG. 11 as surrounding pixel data for a pixel to be ternary-converted in future.

The data $f(i,j)+E(i,j)-m(i,j)$ output from the subtracter 814 is input to the error ROM 819. The error ROM 819 outputs $E_1(i+1,j)$ and $E_2(i,j+1)$ according to the above-mentioned equation. The data $E_1(i+1,j)$ from the error ROM 819 is delayed by one pixel by the D F/F 821, and is assigned to a pixel $(i+1,j)$. The data $E_2(i,j+1)$ is stored in the line memory 820, and is assigned to a pixel $(i,j+1)$ one line after the pixel of interest.

Upon repetition of the series of processing operations, ternary conversion processing of image data is sequentially performed in units of pixels.

When multi-value data is ternary-converted by the above-mentioned operation, quantization which can suppress generation of a pseudo edge, and can obtain a high-quality image, can be realized.

[Tenth Embodiment]

Figure 20:
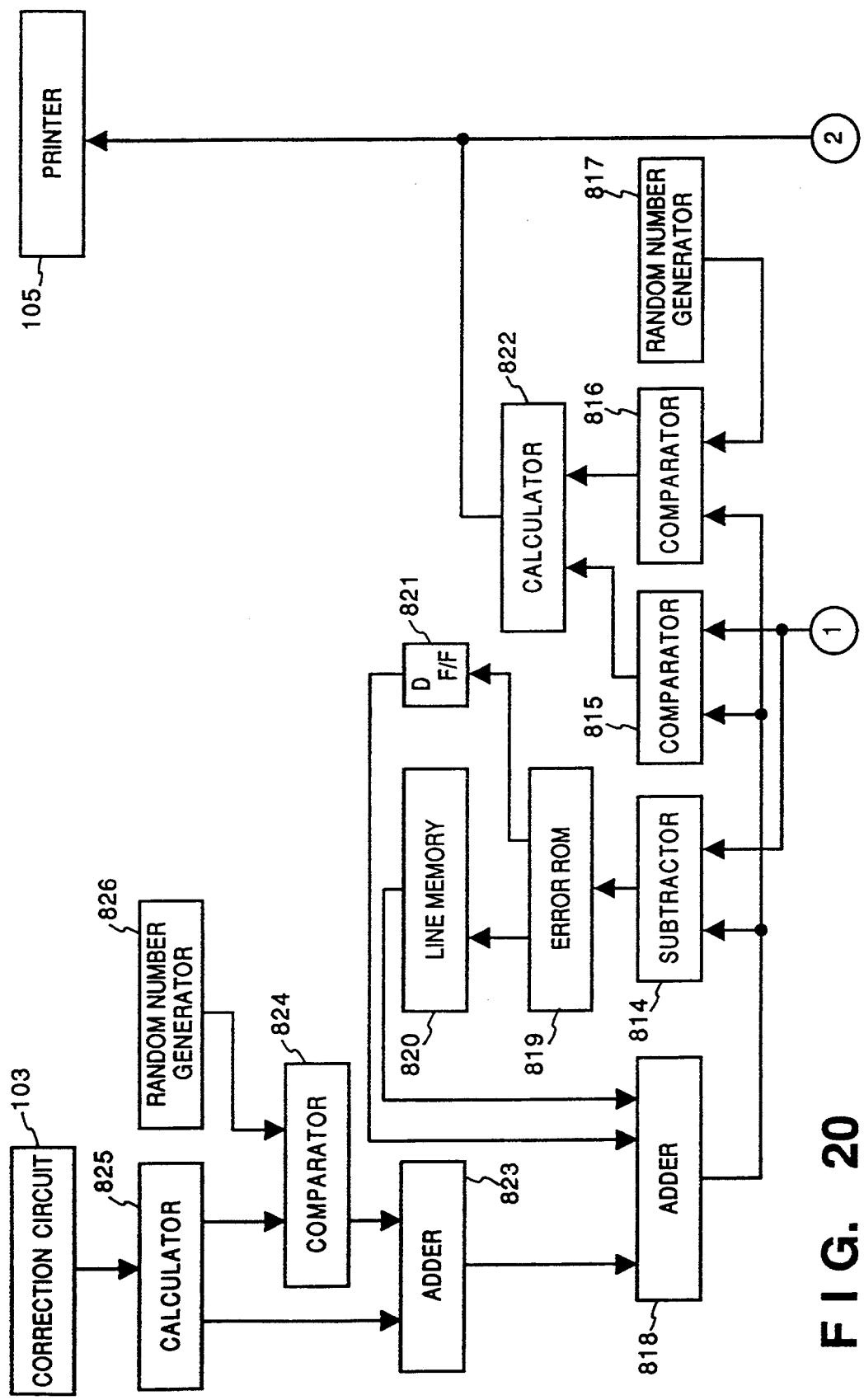
FIG. 20 is a block diagram showing the details of the arrangement of a ternary conversion circuit according to the tenth embodiment of the present invention.

The tenth embodiment of the present invention will be described below with reference to FIG. 20. In this embodiment, multi-value image data is ternary-converted using the density values of surrounding pixels and uniformly generated two random number values as in the ninth embodiment.

The basic arrangement of the tenth embodiment of the present invention is substantially the same as that shown in FIG. 18, except that the arrangement of the ternary conversion circuit 114 is different from the ninth embodiment. FIG. 20 shows a portion, different from the ninth embodiment, of the arrangement of the ternary conversion circuit of the tenth embodiment. In the tenth embodiment, the arrangement shown in FIG. 11 is the same as that in the ninth embodiment described above, and the tenth embodiment comprises the arrangement shown in FIG. 20 in place of the arrangement of the ninth embodiment shown in FIG. 19. In FIG. 20, the same reference numerals denote the same parts as in the ninth embodiment shown in FIG. 19, and a detailed description thereof will be omitted.

In the tenth embodiment, a random number generator 826 is added to an input section from a correction circuit 103, thereby quantizing data of a pixel of interest.

More specifically, a calculator 825 divides 8-bit data $f(i,j)$ of a pixel of interest into upper 6-bit data $f_H(i,j)$ and lower 2-bit data $f_L(i,j)$. The random number generator 826 generates a uniform random number that assumes a value ranging between 0 and 3 at equal probability. A comparator 824 binary-converts the lower-bit data $f_L(i,j)$ using the random number value from the random number generator 826 as a threshold value. The binary-converted lower-bit data $B_L(i,j)$ is added to the upper-bit data $f_H(i,j)$ by an adder 823 according to the following equation to obtain quantized data $h(i,j)$:

$$h(i,j)=f_H(i,j)+B_L(i,j)$$

Thereafter, the data $h(i,j)$ is ternary-converted by the same method as in the ninth embodiment described above. At this time since the number of bits of an error generated upon ternary conversion is decreased, the memory capacity can be saved.

As described above, according to the ninth or tenth embodiment, both regular texture noise and random granular noise can be prevented using two threshold values, i.e., a threshold value based on surrounding-pixel data and a stochastic threshold value. When an error generated upon ternary conversion is corrected, a high-quality image, which has both a high resolution and good gradation characteristics, and is free from a pseudo edge, can be obtained.

[Eleventh Embodiment]

In the above description, multi-value image data is ternary-converted using the density values of surrounding pixels and uniformly generated two random number values. However, the present invention is not limited to ternary conversion of multi-value data, but may be applied to an n-value conversion circuit for converting multi-value data into arbitrary n-value-converted data.

The eleventh embodiment of the present invention will be described below. In this embodiment, 8-bit multi-value image data (0 to 255) is converted into quaternary data (0 to 3).

The eleventh embodiment of the present invention will be described in detail below with reference to the accompanying drawings.

The principle of quaternary conversion in the eleventh embodiment will be described below. In the eleventh embodiment, a weighted average density $m(i,j)$ near a pixel of interest is calculated from already quaternary-converted pixel data according to the weighting mask shown in FIG. 4 (c).

$$m(i,j)=\Sigma\Sigma R(x,y)\cdot G(i+x,j+y)$$

Two threshold values are generated using a uniform random number $ran(i,j)$, which assumes a value ranging between 0 and 127 at equal probability, in units of pixels. These threshold values are normalized to two-divided density areas. More specifically, as one of the two threshold values, $ran(i,j)$ is used without modifications, and as the other threshold value, a value $ran2(i,j)$ obtained by adding 128 to $ran(i,j)$ is used. The value $ran2(i,j)$ assumes a value ranging between 128 and 255.

Multi-value data $f(i,j)$ of the pixel of interest is quaternary-converted according to the following conditions using the calculated $m(i,j)$, the threshold values $ran(i,j)$ and $ran2(i,j)$ obtained by normalizing a uniform random number generated in units of pixels to the corresponding density areas, and a quaternary-conversion error correction value $E(i,j)$ assigned to the pixel of interest:

If $f(i,j)+E(i,j) \leq m(i,j)$, $G(i,j)=0$

If $f(i,j)+E(i,j) > m(i,j)$, and if $ran(i,j) \geq f(i,j)+E(i,j)$, $G(i,j)=1$

If $ran2(i,j) \geq f(i,j)+E(i,j) > ran(i,j)$, $G(i,j)=2$

If $f(i,j)+E(i,j) > ran2(i,j)$, $G(i,j)=3$

A correction value of a quaternary-conversion error generated at that time is simultaneously calculated:

$$E_1(i+1,j)=E_2(i,j+1)=\{f(i,j)+E(i,j)-m(i,j)\}/2$$

where $E_1(i+1,j)$ is the correction value assigned to a pixel $(i+1,j)$ next to the pixel of interest, and $E_2(i,j+1)$ is the correction value assigned to a pixel $(i,j+1)$ one line after the pixel of interest.

The error correction value $E(i,j)$ assigned to the pixel of interest is expressed as a sum of an error $E_1(i,j)$ generated upon quaternary conversion of a pixel $(i-1,j)$ immediately preceding the pixel of interest and an error $E_2(i,j)$ generated upon quaternary conversion of a pixel (i,j−1) one line before the pixel of interest by the above-mentioned method. That is, the value E(i,j) is given by:

$$E(i,j) = E_1(i,j) + E_2(i,j)$$

In this manner, when quaternary conversion is performed using two threshold values, i.e., a regular conditional threshold value and a randomly generated random number value, regular texture noise and random granular noise can be prevented.

FIG. 21 is a block diagram showing a quaternary conversion circuit according to the eleventh embodiment of the present invention, which can achieve the above-mentioned principle, and shows an arrangement different from that of the ninth embodiment. More specifically, in the eleventh embodiment, the overall arrangement of the apparatus can be the same as that shown in FIG. 18, and the ternary conversion circuit 114 is replaced with an n-value conversion circuit. In this case, the eleventh embodiment comprises an arrangement shown in FIGS. 11 and 21 in place of the arrangement shown in FIGS. 11 and 19.

In FIG. 11, reference numerals 701 and 702 denote line memories each for storing quaternary-converted quaternary image data for one line. Reference numerals 703 to 712 and 522 (FIG. 21) denote D F/Fs (flip-flops) each for delaying image data by one pixel. Reference numeral 713 denotes a calculator for calculating a weighted average value of a predetermined area from quaternary image data near a pixel of interest.

In FIG. 21, reference numeral 514 denotes a subtracter for calculating a difference between the weighted average value output from the calculator 713 and multi-value data of the pixel of interest; 515, a comparator for comparing the weighted average value and the multi-value data of the pixel of interest; 516, a comparator for comparing a random number value output from a random number generator 524 and the multi-value data of the pixel of interest; 517, a comparator for comparing a random number value processed by an adder 518 and the multi-value data of the pixel of interest; and 518, an adder for adding 128 to the random number value output from the random number generator 524.

Reference numeral 519 denotes an adder for adding error data for density correction to the multi-value data of the pixel of interest; 520, an error ROM for calculating error data on the basis of the difference between the weighted average value and the multi-value data of the pixel of interest output from the subtracter 514; 521, a line memory for storing error data from the error ROM 520 for one line; 523, a calculator for calculating quaternary data on the basis of judgment results using the respective threshold values; and 524, a random number generator for generating a random number in units of pixels.

An operation upon quaternary conversion of a pixel (i,j) of interest in the above-mentioned arrangement will be described below.

The line memories 701 and 702 store quaternary data which have already been quaternary-converted before the pixel of interest. Upon quaternary conversion of the pixel of interest, the line memory 702 outputs quaternary data G(i+2,j−1) one line before the pixel of interest, and the line memory 701 outputs quaternary data G(i+2,j−2) two lines before the pixel of interest. The D F/Fs 703 to 712 respectively output data delayed by one pixel.

More specifically, the D F/F 703 outputs data G(i+1,j−2); the D F/F 704, G(i,j−2); the D F/F 705, G(i−1,j−2); the D F/F 706, G(i−2,j−2); the D F/F 707, G(i+1,j−1); the D F/F 708, G(i,j−1); the D F/F 709, G(i−1,j−1); the D F/F 710, G(i−2,j−1); the D F/F 711, G(i−1,j); and the D F/F 712, G(i−2,j).

The quaternary data from these D F/Fs 703 to 712 are input to the calculator 713. The calculator 713 calculates a weighted average density value m(i,j) based on the weighting mask from the quaternary data near the pixel of interest.

Multi-value data f(i,j) of the pixel of interest from a correction circuit 103 is input to the adder 519. The adder 519 adds error correction data $E_1(i,j)$ and $E_2(i,j)$ to the multi-value data of the pixel of interest, and outputs data f(i,j)+E(i,j). The subtracter 514 calculates a difference between f(i,j)+E(i,j) and m(i,j).

The comparator 515 compares f(i,j)+E(i,j) and m(i,j) to output a judgment signal $B_1(i,j)$. The random number generator 524 generates a uniform random number ran(i,j) in units of pixels. The adder 518 outputs a value ran2(i,j) obtained by adding (128) to ran(i,j). The comparator 516 compares the random number value ran(i,j) and f(i,j)+E(i,j), and outputs a judgment signal $B_2(i,j)$. The comparator 517 compares the random number value ran2(i,j) and f(i,j)+E(i,j), and outputs a judgment signal $B_3(i,j)$.

The calculator 523 calculates quaternary data G(i,j) on the basis of the comparison judgment signals $B_1(i,j)$, $B_2(i,j)$, and $B_3(i,j)$. The quaternary data G(i,j) is supplied to a printer 105, and the like as quantized data, and is also output to the line memory 702 and the D F/F 711 as surrounding pixel data for a pixel to be quaternary-converted in future.

The data f(i,j)+E(i,j)−m(i,j) output from the subtracter 514 is input to the error ROM 520. The error ROM 520 outputs $E_1(i+1,j)$ and $E_2(i,j+1)$ according to the above-mentioned equation. The data $E_1(i+1,j)$ is delayed by one pixel by the D F/F 522, and is assigned to a pixel (i+1,j). The data $E_2(i,j+1)$ is stored in the line memory 521, and is assigned to a pixel (i,j+1) one line after the pixel of interest.

Upon repetition of the series of processing operations, quaternary conversion processing of image data is sequentially performed in units of pixels.

As described above, according to the eleventh embodiment, both regular texture noise and random granular noise can be prevented using two kinds of threshold values, i.e., a threshold value based on surrounding pixel data, and a stochastic threshold value.

When an error generated upon n-value conversion is corrected, quantization capable of obtaining a high-quality image, which has both a high resolution and good gradation characteristics, and is free from a pseudo edge, can be realized.

[Twelfth Embodiment]

The twelfth embodiment of the present invention will be described below with reference to FIGS. 22 and 23. The basic arrangement of the twelfth embodiment of the present invention is substantially the same as that of the ninth embodiment shown in FIG. 18, except that a quaternary conversion circuit shown in FIGS. 22 and 23 is arranged in place of the ternary conversion circuit 114.

Figure 22:
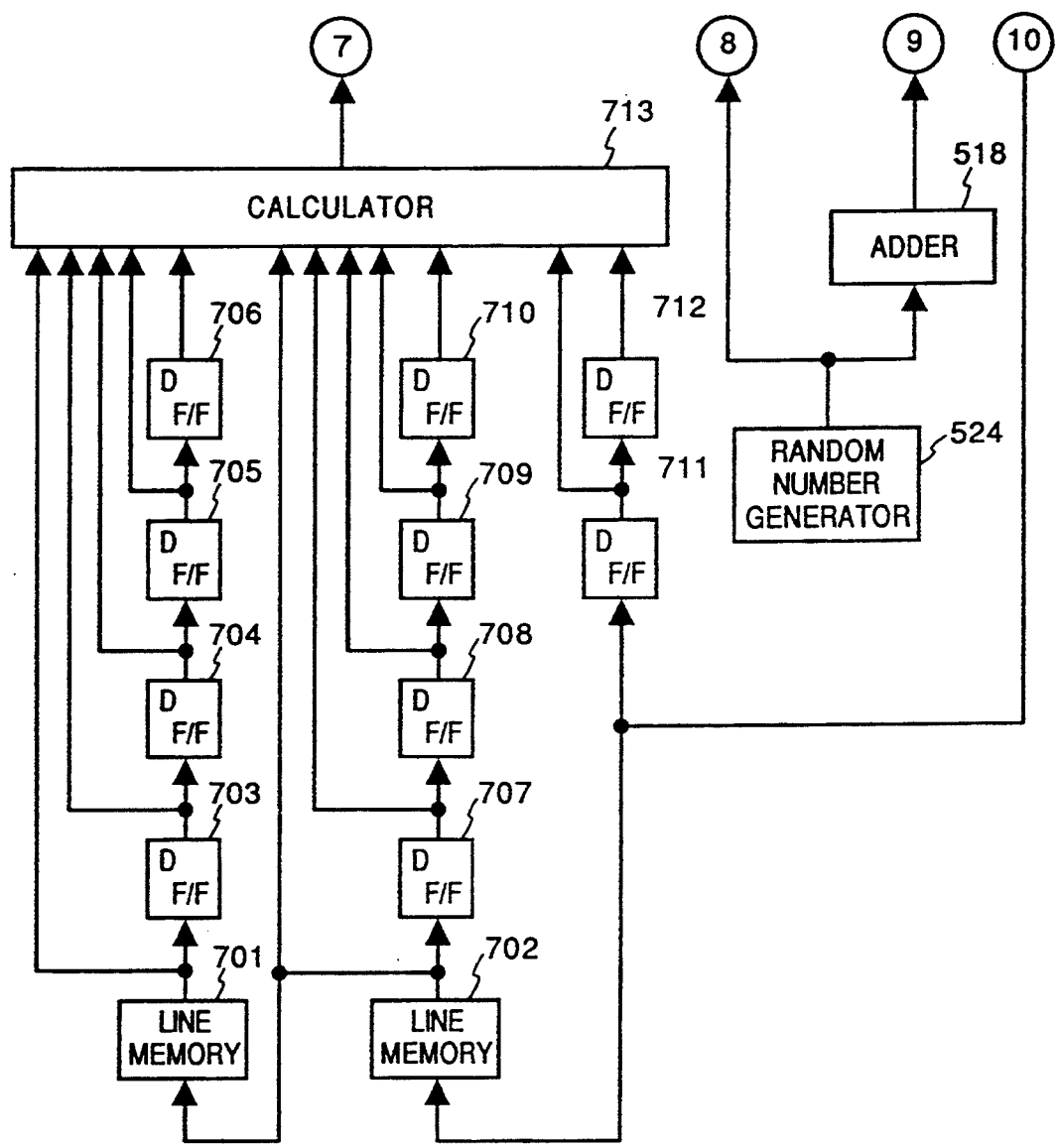
FIGS. 22 and 23 are block diagrams showing the details of the arrangement of a quaternary conversion circuit according to the twelfth embodiment of the present invention.
Figure 23:
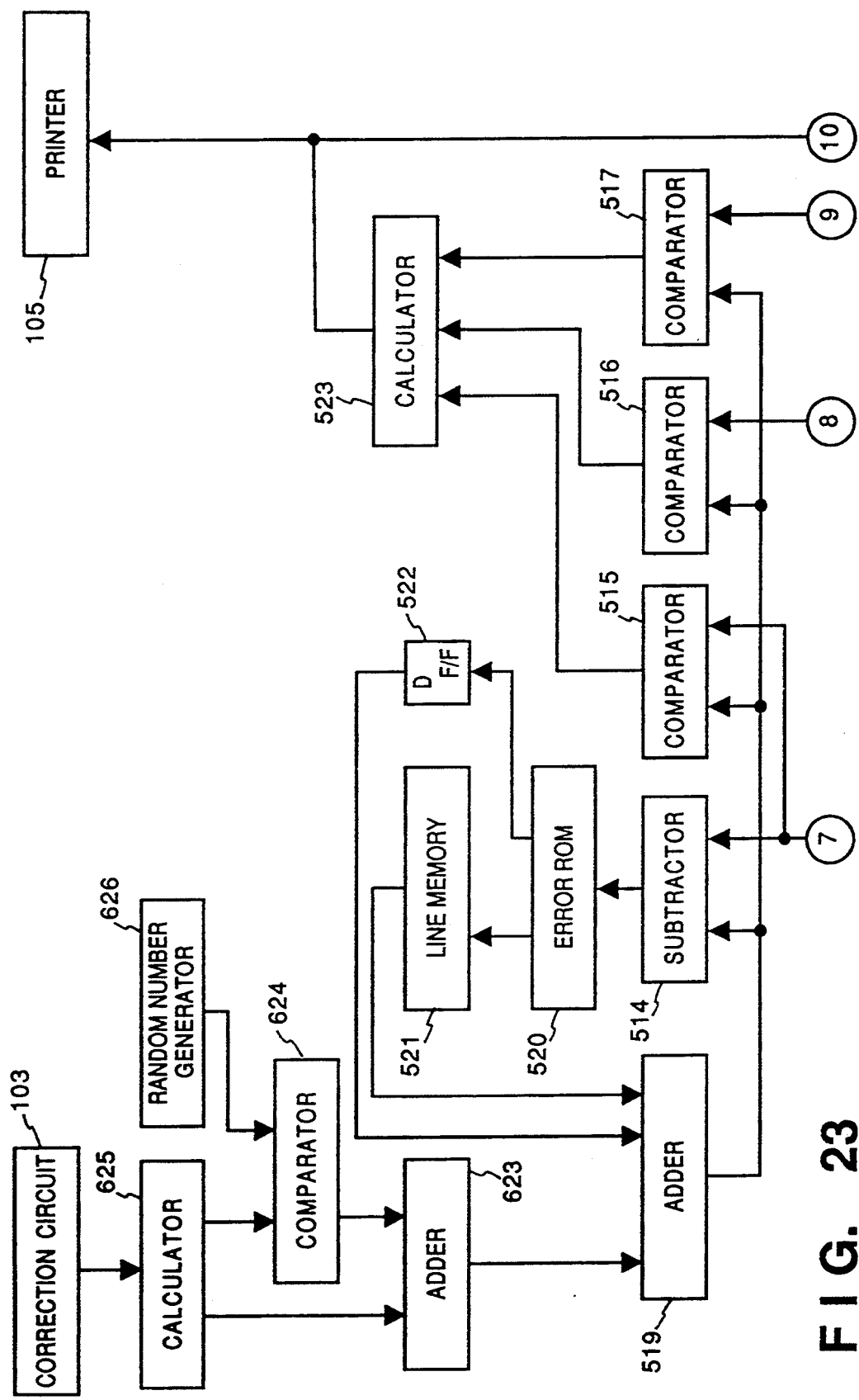

The same reference numerals in FIGS. 22 and 23 denote the same parts as in the arrangement of the eleventh embodiment shown in FIGS. 11 and 21, and a detailed description thereof will be omitted.

In the twelfth embodiment, a random number generator 626 is added to an input section of a correction circuit 103, thereby quantizing data of a pixel of interest.

More specifically, 8-bit data of a pixel of interest is divided into upper 6-bit data $f_H(i,j)$ and lower 2-bit data $f_L(i,j)$ by a calculator 625. The random number generator 626 generates a uniform random number that assumes a value ranging between 0 and 3 at equal probability. A comparator 624 binary-converts the lower-bit data $f_L(i,j)$ using the random number value from the random number generator 626 as a threshold value. The binary-converted lower-bit data $B_L(i,j)$ is added to the upper-bit data $f_H(i,j)$ by an adder 623 according to the following equation to obtain quantized data $h(i,j)$.

$$h(i,j) = f_H(i,j) + B_L(i,j)$$

Thereafter, the data $h(i,j)$ is quaternary-converted by the same method as in the eleventh embodiment described above. At this time, since the number of bits of an error generated upon quaternary conversion is decreased, the memory capacity can be saved.

[Thirteenth Embodiment]

In the above description, multi-value image data is converted to ternary or quaternary data using the density values of surrounding pixels and uniformly generated two random number values. However, the present invention is not limited to ternary or quaternary conversion of multi-value data, but may be applied to an n-value conversion circuit for converting multi-value data into arbitrary n-value-converted data.

The thirteenth embodiment of the present invention will be described below. In this embodiment, 8-bit multi-value image data (0 to 255) is quantized to quinary data (0 to 4).

In the thirteenth embodiment, a weighted average density $m(i,j)$ near a pixel of interest is calculated from already quinary-converted pixel data according to the weighting mask shown in FIG. 4 (c) like in the eleventh embodiment:

$$m(i,j) = \Sigma\Sigma R(x,y) \cdot G(i+x, j+y)$$

Three threshold values are generated using a uniform random number $ran(i,j)$, which assumes a value ranging between 0 and 85 at equal probability, in units of pixels. These threshold values are normalized to three-divided density areas. More specifically, as the first one of the threshold values, $ran(i,j)$ is used without modifications, and as the second threshold value, a value $ran2(i,j)$ obtained by adding 85 to $ran(i,j)$ is used. The value $ran2(i,j)$ assumes a value ranging between 85 and 170.

As the third threshold value, a value $ran3(i,j)$ obtained by adding 170 to $ran(i,j)$ is used. The value $ran3(i,j)$ assumes a value ranging between 170 and 255.

Multi-value data $f(i,j)$ of the pixel of interest is quinary-converted according to the following conditions using the calculated $m(i,j)$, the threshold values $ran(i,j)$, $ran2(i,j)$, and $ran3(i,j)$ obtained by normalizing a uniform random number generated in units of pixels to the corresponding density areas, and a quinary-conversion error correction value $E(i,j)$ assigned to the pixel of interest:

If $f(i,j) + E(i,j) \leq m(i,j), G(i,j) = 0$

If $f(i,j) + E(i,j) > m(i,j)$, and if $ran(i,j) \geq f(i,j) + E(i,j), G(i,j) = 1$ If $ran2(i,j) \geq f(i,j) + E(i,j) > ran(i,j), G(i,j) = 2$ If $ran3(i,j) \geq f(i,j) + E(i,j) > ran2(i,j), G(i,j) = 3$ If $f(i,j) + E(i,j) > ran3(i,j), G(i,j) = 4$ A correction value of a quinary-conversion error generated at that time is simultaneously calculated:

$$E_1(i+1,j) = E_2(i,j+1) = \{f(i,j) + E(i,j) - m(i,j)\}/2$$

where $E_1(i+1,j)$ is the correction value assigned to a pixel $(i+1,j)$ next to the pixel of interest, and $E_2(i,j+1)$ is the correction value assigned to a pixel $(i,j+1)$ one line after the pixel of interest.

The error correction value $E(i,j)$ assigned to the pixel of interest is expressed as a sum of an error $E_1(i,j)$ generated upon quinary conversion of a pixel $(i-1,j)$ immediately preceding the pixel of interest and an error $E_2(i,j)$ generated upon quinary conversion of a pixel $(i,j-1)$ one line before the pixel of interest by the above-mentioned method. That is, the value $E(i,j)$ is given by:

$$E(i,j) = E_1(i,j) + E_2(i,j)$$

In this manner, when quinary conversion is performed using two threshold values, i.e., a regular conditional threshold value and a randomly generated random number value, regular texture noise and random granular noise can be prevented.

In the thirteenth embodiment of the present invention, which can achieve the above-mentioned principle, an arrangement other than the quinary conversion circuit is the same as that of the eleventh embodiment. In the thirteenth embodiment, the quinary conversion circuit has an arrangement shown in FIGS. 11 and 24, and the arrangement shown in FIG. 24 is different from that of the eleventh embodiment.

In FIG. 11, reference numerals 701 and 702 denote line memories each for storing quinary image data, which have been quinary-converted before a pixel of interest, for one line. Reference numerals 703 to 712 and 922 (FIG. 24) denote D F/Fs (flip-flops) each for delaying image data by one pixel. Reference numeral 713 denotes a calculator for calculating a weighted average value of a predetermined area from quinary image data near a pixel of interest.

Figure 24:
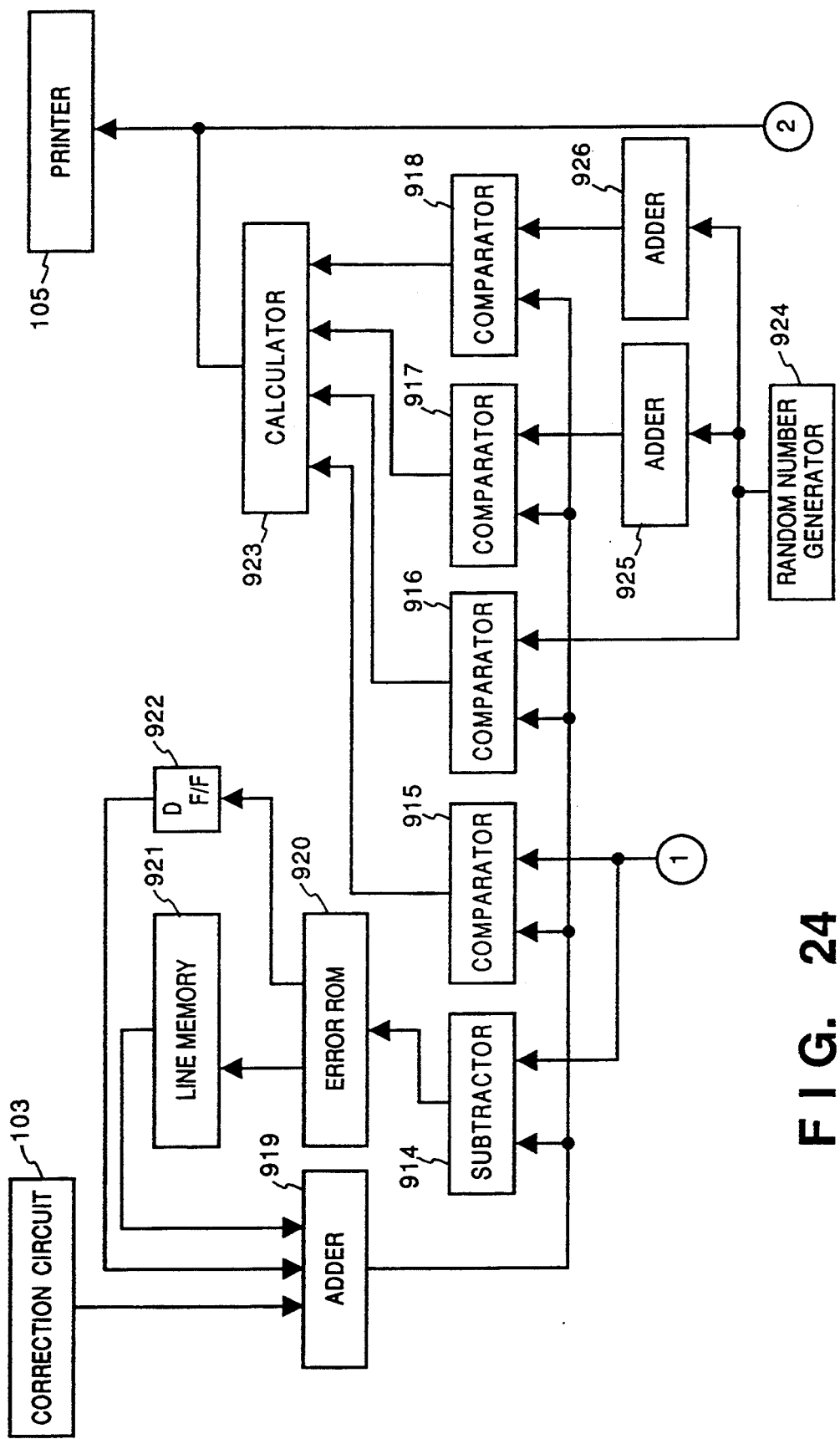
FIG. 24 is a block diagram showing the details of the arrangement of a quinary conversion circuit according to the thirteenth embodiment; of the present invention.

In FIG. 24, reference numeral 914 denotes a subtracter for calculating a difference between the weighted average value output from the calculator 713 and multi-value data of a pixel of interest; 915, a comparator for comparing the weighted average value and the multi-value data of the pixel of interest; 916, a comparator for comparing a random number value output from a random number generator 924 and the multi-value data of the pixel of interest; 917, a comparator for comparing a random number value processed by an adder 925 and the multi-value data of the pixel of interest; 918, a comparator for comparing a random number value processed by an adder 926 and the multi-value data of the pixel of interest; 925, an adder for adding 85 to the random number value output from the random number generator 924; and 926, an adder for adding 170 to the random number value output from the random number generator 924.

Reference numeral 919 denotes an adder for adding error data for density correction to the multi-value data of the pixel of interest; 920, an error ROM for calculating error data on the basis of the difference between the weighted average value and the multi-value data of the pixel of interest output from the subtracter 914; 921, a line memory for storing error data from the error ROM 920 for one line; 923, a calculator for calculating quinary data on the basis of judgment results using respective threshold values; and 924, a random number generator for generating a random number in units of pixels.

An operation upon quinary conversion of a pixel (i,j) of interest in the above-mentioned arrangement will be described below.

The line memories 701 and 702 store quinary data which have already been quinary-converted before the pixel of interest. Upon quinary conversion of the pixel of interest, the line memory 702 outputs quinary data $G(i+2,j-1)$ one line before the pixel of interest, and the line memory 701 outputs quinary data $G(i+2,j-2)$ two lines before the pixel of interest. The D F/Fs 703 to 712 respectively output data delayed by one pixel.

More specifically, the D F/F 703 outputs data $G(i+1,j-2)$; the D F/F 704, $G(i,j-2)$; the D F/F 705, $G(i-1,j-2)$; the D F/F 706, $G(i-2,j-2)$; the D F/F 707, $G(i+1,j-1)$; the D F/F 708, $G(i,j-1)$; the D F/F 709, $G(i-1,j-1)$; the D F/F 710, $G(i-2,j-1)$; the D F/F 711, $G(i-1,j)$; and the D F/F 712, $G(i-2,j)$.

The quinary data from these D F/Fs 703 to 712 are input to the calculator 713. The calculator 713 calculates a weighted average density value $m(i,j)$ based on the weighting mask from the quinary data near the pixel of interest.

On the other hand, multi-value data $f(i,j)$ of the pixel of interest from a correction circuit 103 is input to the adder 919. The adder 919 adds error correction data $E_1(i,j)$ and $E_2(i,j)$ to the multi-value data of the pixel of interest, and outputs data $f(i,j)+E(i,j)$. The subtracter 914 calculates a difference between $f(i,j)+E(i,j)$ and $m(i,j)$. The comparator 915 compares $f(i,j)+E(i,j)$ and $m(i,j)$, and outputs a judgment signal $B_1(i,j)$. The random number generator 924 generates a uniform random number: $ran(i,j)$ in units of pixels. The adder 925 outputs a value $ran2(i,j)$ obtained by adding (85) to $ran(i,j)$. The adder 926 outputs a value $ran3(i,j)$ obtained by adding (170) to $ran(i,j)$. The comparator 916 compares the random number value $ran(i,j)$ and $f(i,j)+E(i,j)$, and outputs a judgment signal $B_2(i,j)$.

The comparator 917 compares the random number value $ran2(i,j)$ and $f(i,j)+E(i,j)$, and outputs a judgment signal $B_3(i,j)$. The comparator 918 compares the random number value $ran3(i,j)$ and $f(i,j)+E(i,j)$, and outputs a judgment signal $B_4(i,j)$.

The calculator 923 calculates quinary data $G(i,j)$ on the basis of the comparison judgment signals $B_1(i,j)$, $B_2(i,j)$, $B_3(i,j)$, and $B_4(i,j)$. The quinary data is supplied to a printer 105, and the like as quantized data, and is also output to the line memory 702 and the D F/F 711 as surrounding pixel data for a pixel to be quinary-converted in future.

The data $f(i,j)+E(i,j)-m(i,j)$ output from the subtracter 914 is input to the error ROM 920. The error ROM 920 outputs $E_1(i+1,j)$ and $E_2(i,j+1)$ according to the above-mentioned equation. The data $E_1(i+1,j)$ is delayed by one pixel by the D F/F 922, and is assigned to a pixel $(i+1,j)$. The data $E_2(i,j+1)$ is stored in the line memory 921, and is assigned to a pixel $(i,j+1)$ one line after the pixel of interest.

Upon repetition of the series of processing operation, quinary conversion processing of image data is sequentially performed in units of pixels.

As described above, according to the thirteenth embodiment, both regular texture noise and random granular noise can be prevented using two kinds of threshold values, i.e., a threshold value based on surrounding pixel data, and a stochastic threshold value.

When an error generated upon n-value conversion is corrected, quantization capable of obtaining a high-quality image, which has both a high resolution and good gradation characteristics, and is free from a pseudo edge, can be realized.

The present invention can be applied to either a system constituted by a plurality of devices or to an apparatus consisting of a single device.

The present invention can also be applied to a case wherein the invention is achieved by supplying a program to the system or apparatus.

As described above, according to the present invention, both regular texture noise and random granular noise can be prevented using two kinds of threshold values, i.e., a threshold value based on surrounding pixel data, and a stochastic threshold value. When an error generated upon n-value conversion is corrected, a high-quality image, which has both a high resolution and good gradation characteristics, and is free from a pseudo edge, can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for quantizing multi-value image data to binary data, comprising:
    average value calculation means for calculating a plurality of weighted average values of a plurality of pixels near a pixel of interest on the basis of binary data of pixels which have already been binary-converted before the pixel of interest;
    random number generation means for generating a random number;
    lower-bit binary-conversion means for binary-converting lower-bit data of an image signal of the pixel of interest on the basis of the random number value generated by said random number generation means;
    adder means for adding the lower-bit data binary-converted by said lower-bit binary-conversion means to upper-bit data of the image signal of the pixel of interest; and
    upper-bit binary-conversion means for binary-converting the upper-bit data of the image signal of the pixel of interest on the basis of a plurality of weighted average values calculated by said average value calculation means.

2. The apparatus according to claim 1, further comprising correction means for preserving a density by distributing a density error generated upon binary conversion of the upper-bit data of the pixel of interest by said upper-bit binary-conversion means to non-binary-converted pixels near the pixel of interest.

3. The apparatus according to claim 1, wherein said average value calculation means calculates the average values on the basis of a plurality of weighting masks having different sizes.

4. The apparatus according to claim 1, wherein said lower-bit binary-conversion means performs binary conversion using the random number value generated by said random number generation means as a threshold value.

5. The apparatus according to claim 1, wherein said upper-bit binary-conversion means includes selection means for selecting one of the plurality of weighted average values calculated by said average value calculation means, and performs binary conversion using the weighted average value selected by said selection means as a threshold value.

6. The apparatus according to claim 5, wherein said selection means selects one of the plurality of weighted average values on the basis of multi-value data of the pixel of interest before binary conversion.

7. An image processing method of quantizing multi-value image data to binary data, comprising:
the first step of generating a random number, and binary-converting lower-bit data of an image signal of a pixel of interest on the basis of the generated random number;
the second step of adding the lower-bit data of the pixel of interest binary-converted in the first step to upper-bit data of the image signal of the pixel of interest; and
the third step of calculating a plurality of weighted average values of a plurality of pixels near the pixel of interest on the basis of binary data of pixels, which have already been binary-converted before the pixel of interest, and binary-converting the upper-bit data of the image signal of the pixel of interest on the basis of the plurality of calculated weighted average values.

8. The method according to claim 7, further comprising the fourth step of preserving a density by distributing a density error generated upon binary conversion of the upper-bit data of the pixel of interest in the third step to non-binary-converted pixels near the pixel of interest.

9. The method according to claim 7, wherein the third step includes the selection step of selecting one of the plurality of calculated weighted average values, and the upper-bit data is binary-converted using the weighted average value selected in the selection step as a threshold value.

10. The method according to claim 9, wherein in the selection step, one of the weighted average values is selected on the basis of multi-value data of the pixel of interest before binary conversion.

11. An image processing apparatus for quantizing multi-value image data to binary data, comprising:
binary data memory means for storing binary data of pixels, which have already been binary-converted before a pixel of interest;
average value calculation means for calculating a weighted average value near the pixel of interest on the basis of the binary data stored in said binary data memory means;
random number generation means for generating a random number;
lower-bit binary-conversion means for binary-converting lower-bit data of a multi-value image signal on the basis of the random number value generated by said random number generation means;
adder means for adding the lower-bit data binary-converted by said lower-bit binary-conversion means to upper-bit data of the multi-value image signal;
upper-bit binary-conversion means for binary-converting the sum data from said adder means on the basis of the weighted average value calculated by said average value calculation means;
error memory means for storing a density error generated upon binary conversion by said upper-bit binary-conversion means;
correction means for preserving a density by distributing the density error stored in said error memory means to non-binary-converted pixels near the pixel of interest; and
setting means for sharing storage areas of said binary data memory means and said error memory means, and setting a ratio of the storage areas of said binary data memory means and said error memory means according to processing.

12. The apparatus according to claim 11, wherein said upper-bit binary-conversion means includes selection means for selecting one of a plurality of weighted average values calculated by said average value calculation means, and performs binary conversion using the weighted average value selected by said selection means as a threshold value.

13. The apparatus according to claim 12, wherein said selection means selects one of the plurality of weighted average values on the basis of the multi-value image data of the pixel of interest before binary conversion.

14. An image processing method of quantizing multi-value image data to binary data, comprising:
the first step of generating a random number, and binary-converting lower-bit data of an image signal of a pixel of interest on the basis of the generated random number;
the second step of adding the lower-bit data of the pixel of interest binary-converted in the first step to upper-bit data of the image signal of the pixel of interest;
the third step of calculating a plurality of weighted average values of a plurality of pixels near the pixel of interest on the basis of stored binary data of pixels which have already been binary-converted before the pixel of interest, and binary-converting the upper-bit data of the image signal of the pixel of interest on the basis of the plurality of calculated weighted average values;
the fourth step of storing a density error generated upon binary conversion in the third step, and preserving a density by distributing the stored density error to non-binary-converted pixels near the pixel of interest; and
the setting step of sharing a storage area of the binary data of the pixels which have already been binary-converted before the pixel of interest, and a storage area of the density error generated upon binary conversion in the third step, and setting a ratio of the two storage areas according to processing.

15. An image processing apparatus capable of binary-converting multi-value image data expressed by an n-bit signal by at least two different binary conversion methods in units of pixels, comprising:
selection means for selecting one of the binary conversion methods on the basis of a value of upper l-bit data (l<n) of the multi-value image data;
first binary-conversion means for binary-converting lower m-bit data (m<n) of the multi-value image data by the binary conversion method selected by said selection means; and second binary-conversion means for binary-converting the multi-value image data quantized by binary-converting the lower m-bit data by a binary conversion method different from the binary conversion method for the lower m-bit data.

16. The apparatus according to claim 15, wherein said first binary-conversion means includes:
random number generation means for generating a normalized uniform random number in units of pixels; and
calculation means for binary-converting the lower m-bit data on the basis of the random number generated by said random number generation means.

17. The apparatus according to claim 15, wherein said first binary-conversion means includes:
calculation means for binary-converting the multi-value image data using a dither matrix as a threshold value.

18. The apparatus according to claim 15, wherein said second binary-conversion means includes:
average value calculation means for calculating a weighted average value near the pixel of interest on the basis of binary data of pixels which have already been binary-converted before the pixel of interest; and
binary-conversion calculation means for binary-converting the quantized multi-value image data on the basis of the average value calculated by said average value calculation means.

19. The apparatus according to claim 15, wherein said second binary-conversion means binary-converts the quantized multi-value image data using an error diffusion method.

20. An image processing method in an image processing apparatus capable of binary-converting multi-value image data expressed by an n-bit signal by at least two different binary conversion methods in units of pixels, comprising:
the selection step of selecting one of the binary conversion methods on the basis of a value of upper l-bit data (l<n) of the multi-value image data;
the first binary-conversion step of binary-converting lower m-bit data (m<n) of the multi-value image data by the binary conversion method selected in the selection step; and
the second binary-conversion step of binary converting the multi-value image data quantized by binary-converting the lower m-bit data by a binary conversion method different from the binary conversion method for the lower m-bit data.

21. The method according to claim 20, wherein the first binary-conversion step includes the calculation step of generating a normalized uniform random number in units of pixels, and binary-converting the lower m-bit data on the basis of the generated random number.

22. The method according to claim 20, wherein the first binary-conversion step includes the calculation step of binary-converting the multi-value image data using a dither matrix as a threshold value.

23. The method according to claim 20, wherein the second binary-conversion step includes:
the average value calculation step of calculating a weighted average value near the pixel of interest on the basis of binary data of pixels, which have already been binary-converted before the pixel of interest; and
the binary-conversion calculation step of binary-converting the quantized multi-value image data on the basis of the average value calculated in the average value calculation step.

24. The method according to claim 20, wherein in the second binary-conversion step, the quantized multi-value image data is binary-converted using an error diffusion method.

25. An image processing apparatus for quantizing multi-value image data to n-value data, comprising:
calculation means for calculating a weighted average value near a pixel of interest on the basis of n-value data of pixels which have already been n-value-converted before the pixel of interest;
random number generation means for generating a normalized uniform random number;
second random number generation means for dividing a density area into (n-2) areas, and generating (n-2) normalized second random numbers by normalizing the uniform random number generated by said random number generation means according to the divided areas;
n-value conversion means for n-value-converting the pixel of interest on the basis of the weighted average value calculated by said calculation means and the (n-2) random number values generated by said second random number generation means; and
correction means for preserving a density by distributing a density error generated upon n-value conversion of the pixel of interest to non-n-value-converted pixels near the pixel of interest.

26. The apparatus according to claim 25, wherein said n-value conversion means uses the weighted average value calculated by said calculation means as a threshold value for classifying data into 0 and a value other than 0, and uses the (n-2) normalized random number values generated by said second random number generation means as threshold values for classifying data into corresponding density levels.

27. The apparatus according to claim 25, wherein said correction means distributes a difference; between multi-value image data of the pixel of interest and the weighted average value near the pixel of interest to the non-n-value-converted pixels.

28. An image processing method in an image processing apparatus for quantizing multi-value image data to n-value data, comprising:
the calculation step of calculating a weighted average value near a pixel of interest on the basis of n-value data of pixels which have already been n-value-converted before the pixel of interest;
the random number generation step of dividing a density area into (n-2) areas, generating a normalized uniform random number, and generating (n-2) normalized second random numbers by normalizing the generated uniform random number according to the divided areas;
the n-value conversion step of n-value-converting the pixel of interest on the basis of the weighted average value calculated in the calculation step and the (n-2) random number values generated in the random number generation step; and
the correction step of preserving a density by distributing a density error generated upon n-value conversion of the pixel of interest to non-n-value-converted pixels near the pixel of interest.

29. The method according to claim 28, wherein in the n-value conversion step, the weighted average value calculated in the calculation step is used as a threshold value for classifying data into 0 and a value other than 0, and the (n-2) normalized random number values generated in the random number generation step are used as threshold values for classifying data into corresponding density levels.

30. The method according to claim 28, wherein in the correction step, a difference between multi-value image data of the pixel of interest and the weighted average value near the pixel of interest is distributed to the non-n-value-converted pixels.

31. An image processing apparatus comprising:

first generation means for generating a random number;

second generation means for generating a dither threshold value;

selection means for selecting either one of the random number and the dither threshold value, on the basis of a value of upper l-bit data ($l<n$) of the multi-value image data;

first binary conversion means for binary-converting lower m-bit data ($m<n$) of the multi-value image data by the random number or the dither threshold value selected by said selection means; and second binary-conversion means for binary-converting the multi-value image data quantized by binary-converting the lower m-bit data.

* * * * *

UNITED STATES PATENT AND TRADEMARK OFFICE
CERTIFICATE OF CORRECTION

PATENT NO. : 5,394,250
DATED : February 28, 1995
INVENTOR(S) : SEITA SHONO

It is certified that error appears in the above-identified patent and that said Letters Patent is hereby corrected as shown below:

ON TITLE PAGE

In [30] Foreign Application Priority Data:
```
"Mar. 10, 1991 [JP]   Japan .............  3-256187
 Jun.  1, 1992 [JP]   Japan .............  4-000119
 Jun.  1, 1992 [JP]   Japan .............  4-000120
 Jun.  1, 1992 [JP]   Japan .............  4-000121"
``` should read
```
"Oct. 3, 1991 [JP}   Japan ..........  3-256187
 Jan. 6, 1992 [JP]   Japan ..........  4-000119
 Jan. 6, 1992 [JP]   Japan ..........  4-000120
 Jan. 6, 1992 [JP]   Japan ..........  4-000121--.
```

COLUMN 1

Line 16, ""Japanese" should read --Japanese--;
"No. 2-210959"" should read --No. 2-210959--; and
"is" should be deleted.

Line 46, "Conven-" should read --For this purpose, a large memory capacity is--.

Line 47, "tional method of binary" should be deleted.

Line 49, "Furthermore, a conventional method" should read --Conventional methods--.

COLUMN 2

Line 4, "object" should read --aspect--.
Line 11, "aspect" should be deleted and "object" should read --aspect--.
Line 29, "resolution uses" should read --resolution, using--.
Line 45, "mean" should read --means--.

UNITED STATES PATENT AND TRADEMARK OFFICE
CERTIFICATE OF CORRECTION

PATENT NO. : 5,394,250
DATED : February 28, 1995
INVENTOR(S) : SEITA SHONO

It is certified that error appears in the above-identified patent and that said Letters Patent is hereby corrected as shown below:

COLUMN 4

Line 37, "pseudo edge," should read --pseudo-edge,--.

COLUMN 5

Line 48, "embodiment;" should read --embodiment--.

COLUMN 6

Line 2, "and" should read --an--.

COLUMN 11

Line 46, "lation" should read --lating--.

COLUMN 12

Line 68, "deterioration" should read --deterioration of--.

COLUMN 18

Line 34, "fox" should read --for--.

COLUMN 24

Line 2, "pseudo edge," should read --pseudo-edge,--.

COLUMN 29

Line 42, "number:" should read --number--.

UNITED STATES PATENT AND TRADEMARK OFFICE
CERTIFICATE OF CORRECTION

PATENT NO. : 5,394,250
DATED : February 28, 1995
INVENTOR(S) : SEITA SHONO

It is certified that error appears in the above-identified patent and that said Letters Patent is hereby corrected as shown below:

COLUMN 30

Line 13, "pseudo edge," should read --pseudo-edge,--.
    Line 28, "pseudo edge," should read --pseudo-edge,--.

COLUMN 34

Line 39, "difference;" should read --difference--.

Signed and Sealed this

Twentieth Day of June, 1995

Attest:

BRUCE LEHMAN

*Attesting Officer*      *Commissioner of Patents and Trademarks*